Nov. 25, 1958

A. H. YOUMANS 2,861,699

METHOD AND APPARATUS FOR PERFORMING
OPERATIONS AT A REMOTE POINT

Filed Oct. 16, 1950

INVENTOR.
Arthur H. Youmans

BY James Y. Cleveland

ATTORNEY

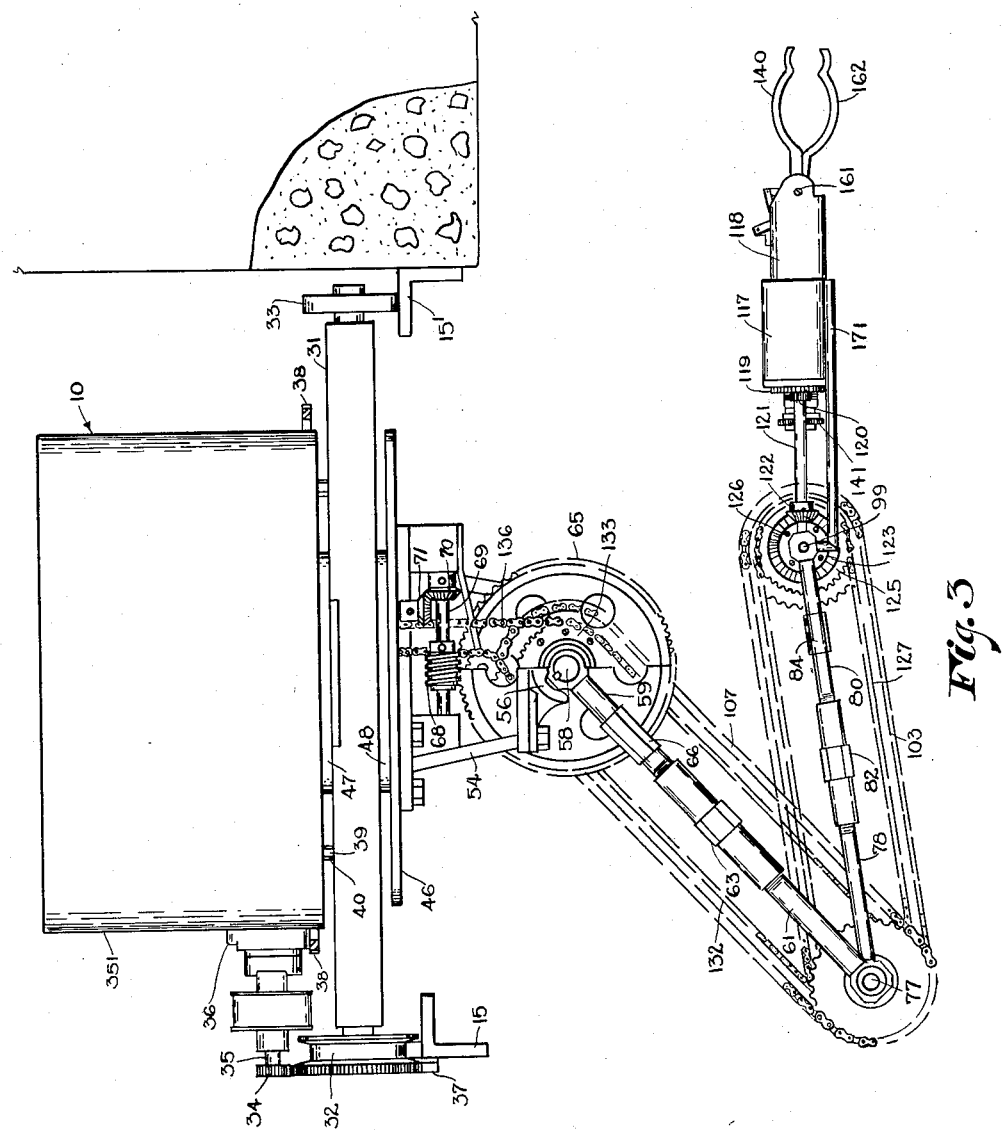

Nov. 25, 1958

A. H. YOUMANS 2,861,699

METHOD AND APPARATUS FOR PERFORMING
OPERATIONS AT A REMOTE POINT

Filed Oct. 16, 1950

INVENTOR.
Arthur H. Youmans

BY James Y. Cleveland

ATTORNEY

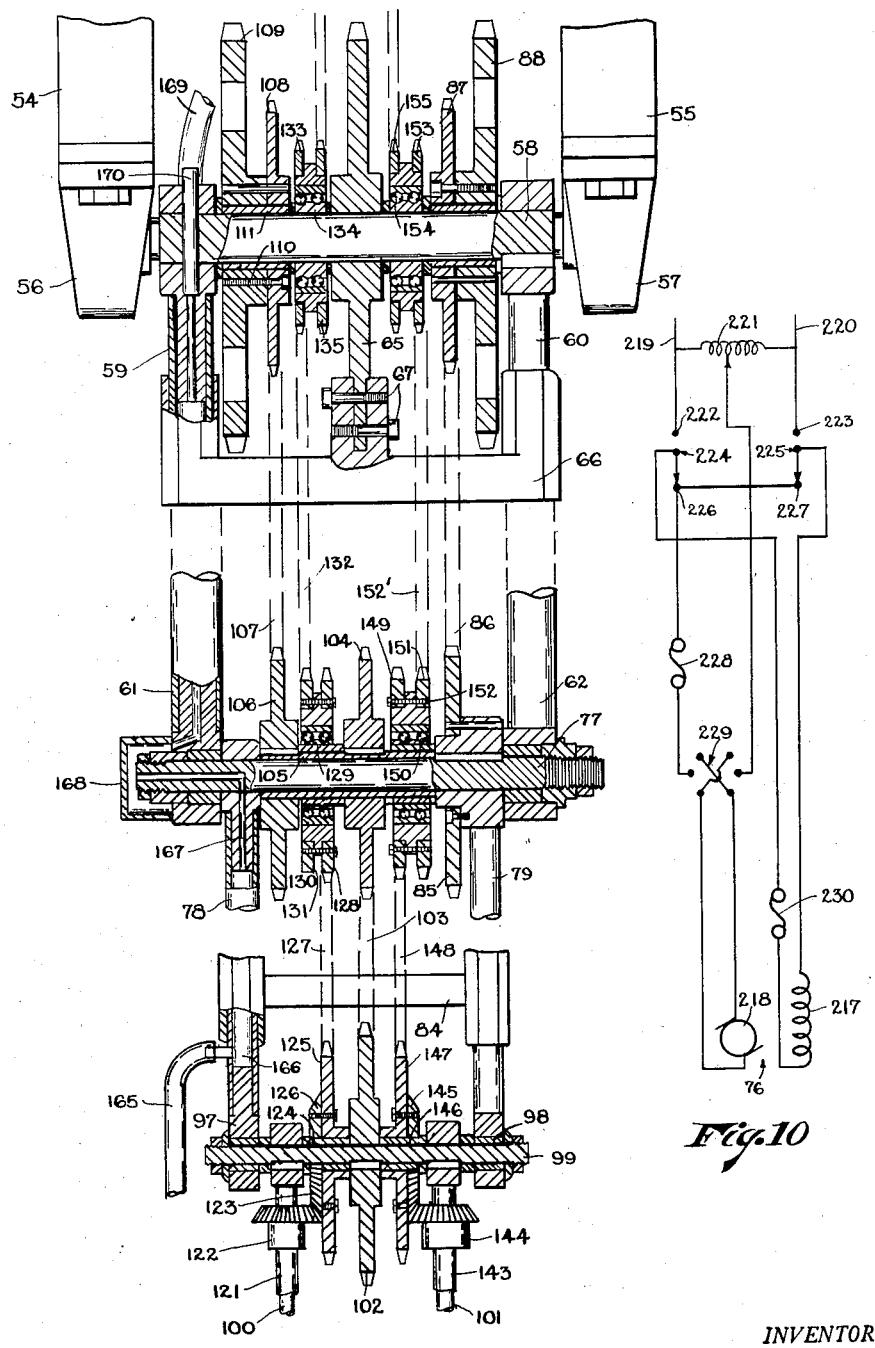

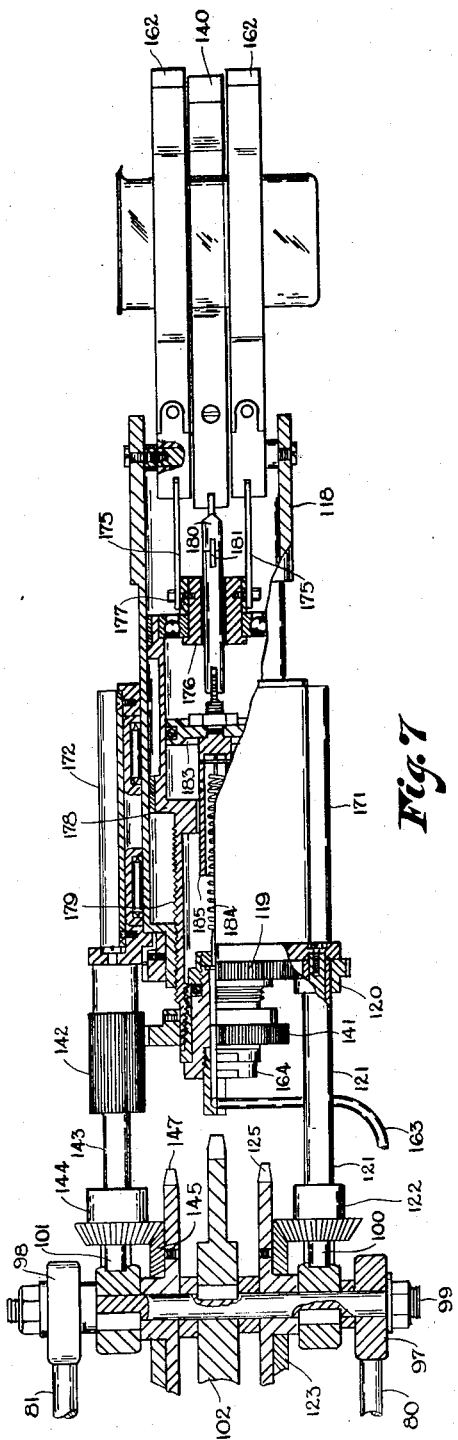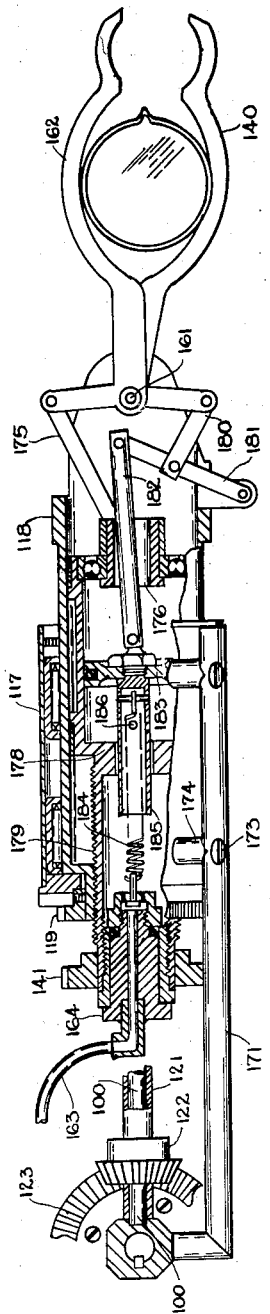

Nov. 25, 1958 A. H. YOUMANS 2,861,699
METHOD AND APPARATUS FOR PERFORMING
OPERATIONS AT A REMOTE POINT
Filed Oct. 16, 1950 10 Sheets-Sheet 7

INVENTOR.
Arthur H. Youmans

BY *James Y. Cleveland*

ATTORNEY

Nov. 25, 1958 A. H. YOUMANS 2,861,699
METHOD AND APPARATUS FOR PERFORMING
OPERATIONS AT A REMOTE POINT
Filed Oct. 16, 1950 10 Sheets-Sheet 8

INVENTOR.
Arthur H. Youmans
BY James Y. Cleveland
ATTORNEY

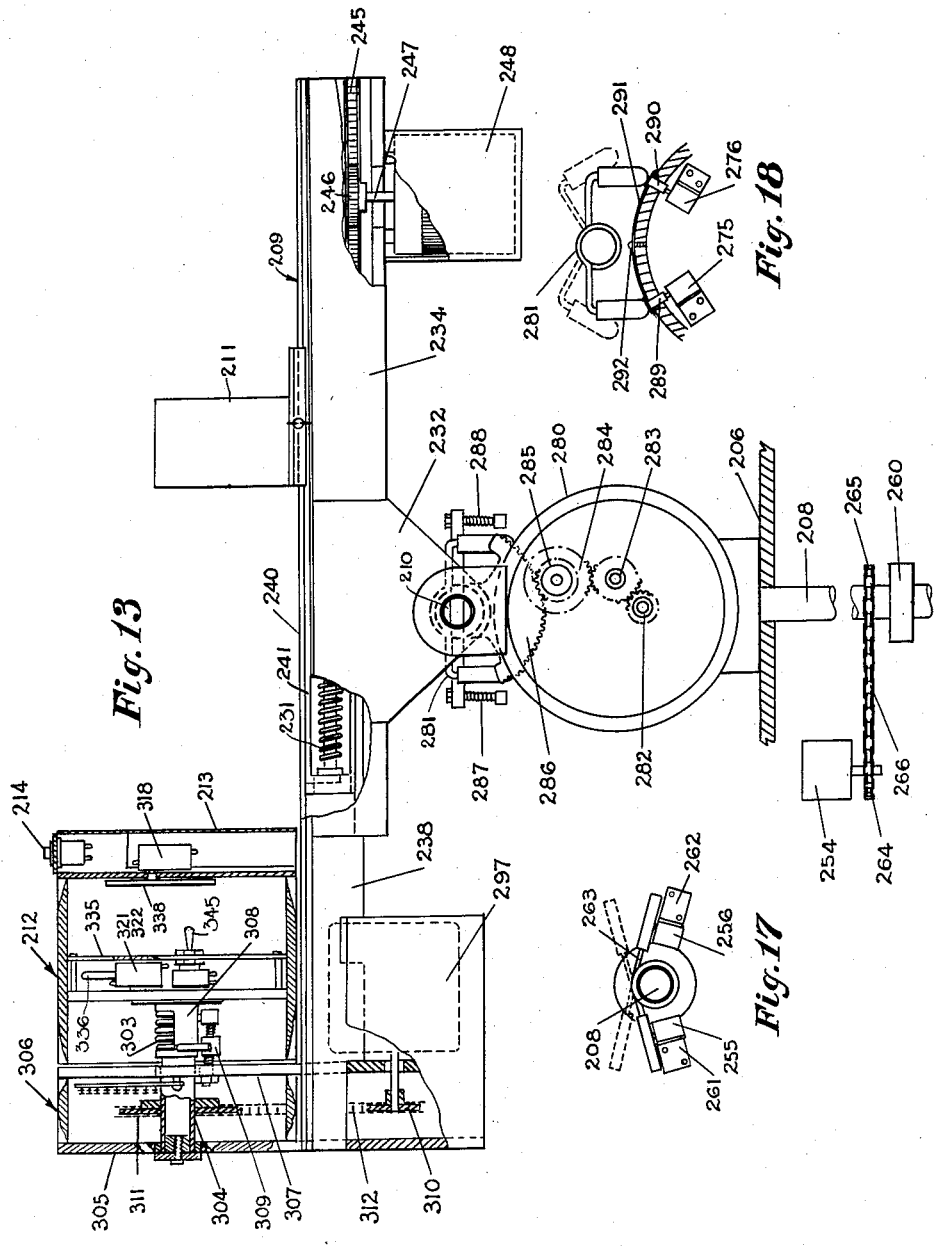

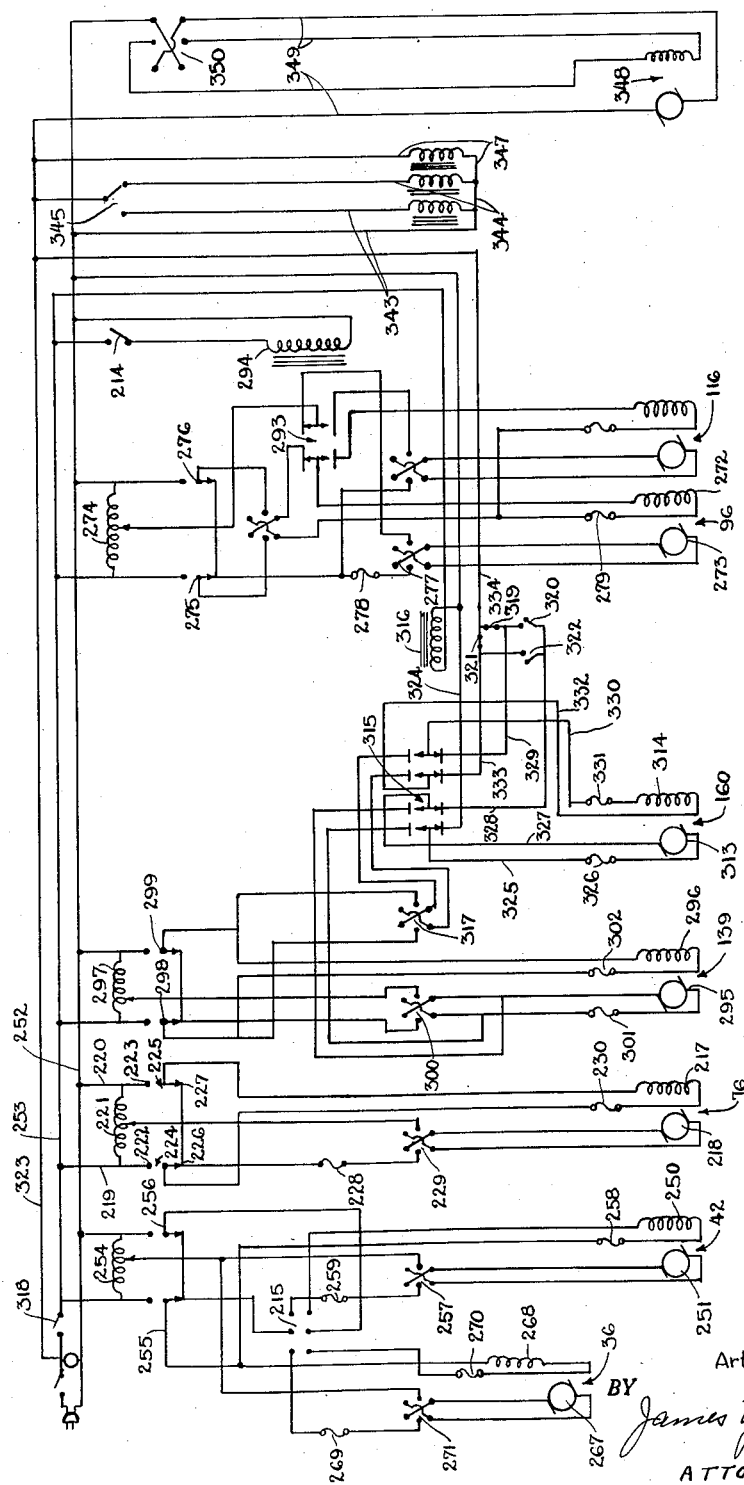

United States Patent Office 2,861,699
Patented Nov. 25, 1958

2,861,699

METHOD AND APPARATUS FOR PERFORMING OPERATIONS AT A REMOTE POINT

Arthur H. Youmans, Tulsa, Okla., assignor, by mesne assignments, to General Mills, Inc., Minneapolis, Minn., a corporation of Delaware Application October 16, 1950, Serial No. 190,387

10 Claims. (Cl. 214—1)

This invention relates to manipulative devices and controls therefor, and more particularly to a method and apparatus whereby an operator can cause the manipulative device to perform operations at a remote point through the medium of electrical controls.

Modern research, particularly in the fields of nuclear energy, toxic biology, chemistry, explosives, etc., has created a demand for methods and apparatus for conducting experiments or performing operations at points remote from the operator in order that the operator will not be subjected to harmful effects such as radioactive radiation, poisons, gases, explosions, etc. Workers in the prior art have attempted to meet this demand either by the use of extremely specialized remote control mechanisms or by providing mechanically controlled manipulating devices which could be operated through or over a protective barrier by use of appropriate mechanical linkages while using mirrors or periscopes to view the operations. Such devices have met with a degree of success but have proved to be lacking in dexterity and versatility and to be restricted in their degrees of freedom and as a result the operations capable of being carried out by such devices are extremely limited.

Due to the restriction of their degrees of freedom these prior art devices are awkward to operate, making it substantially impossible for an operator to co-ordinate movements of the manipulator with those of his hands.

Outstanding among the prior art devices is a "mechanical hand" which has been invented by John H. Payne, Jr., and disclosed in U. S. Patent No. 2,476,249 which issued July 12, 1949. The manipulator of this disclosure is controlled partially by direct mechanical linkage with the operator and partially by electric motors. It comprises basically a large frame in the shape of an inverted U which is adapted to straddle the top of a protective barrier intervening between the operator and the manipulator. The device is provided with suitable pivotal joints whereby endless cables, arranged to maintain a constant length, control the motors which produce movement of the manipulator. The operator located on the opposite side of the protective barrier from the manipulator moves one end of the U-frame and the manipulator moves in a corresponding manner. Such an arrangement is necessarily somewhat more complicated than a rigid frame in order that the movements of the operator may be reproduced in sense at the remote end of the apparatus by means of a single long vertical member which is capable of a limited translatory and rotary motion. All translational movement of the apparatus is done manually by the direct mechanical linkage between the manipulator and the operator. Rotation of the hand of the manipulator about its own axis and rotation about a pivot corresponding to the wrist in a human arm are made possible through the medium of electric motors. The clamping of the fingers of the hand of the manipulator is controlled hydraulically by a foot-pedal.

The limitations of such a device are apparent and arise largely from the fact that its range is limited because it is part of a rigid framework, one end of which must be held by the operator. It lacks maneuverability because its movements are limited to the movements which an operator is able to make while he is holding a complicated and cumbersome mechanism of large inertia and appreciable frictional resistance. It could certainly not be used where a great distance intervenes between the operator and the scene of operations.

Another mechanical manipulator has been invented by Raymond Goertz of the Argonne National Laboratory. A photograph of this device may be seen on page xiii of the November 1949, issue of the "Review of Scientific Instruments."

As may be seen from this photograph, it is apparently entirely mechanical in operation, and is, though smaller in size, in fact essentially the same in principle as the Payne device discussed above except for the complete absence of electrical controls. Again one sees that the direct mechanical linkage which connects the controller with the manipulator limits both the range and the maneuverability of the device, and, as well, renders it impossible to operate with a great or variable distance or an unbroken barrier intervening between the manipulator and the controller. With reasonable exactness one may state that both this and the Payne device are comparable to large, complicated tongs with which an operator may reach over a wall and perform manipulations. Both are arranged to give a correspondence between the position of the mechanical hand and the position of the operator's hand on the controlling mechanism. Doubtless both of these devices serve a useful purpose and can be used for certain types of manipulation requiring a degree of precision. At least in the case of the Goertz manipulator, since it is small, there may be the advantage that the operator can roughly estimate, by his perception of the resistance to motion offered by the controls, the magnitude of the forces which the mechanical hand is exerting. This sensory perception will, however, be rendered difficult by any frictional or inertial resistance to movement arising from the mechanism itself. Neither of these objectionable properties can be easily eliminated in Goertz's design. There is a further difficulty that if all degrees of freedom are constructed so as to be very easy to actuate, considerable skill will be required of the operator to manipulate them independently. Such skill is required because it is difficult, for example, to produce rotation of the hand, without otherwise moving it, and difficult to bend the wrist without moving the arm. The arms of these two models have in effect only one movable joint, all other motion being accomplished by translation of the whole mechanism, controller and all. Another disadvantage of both these devices is that they require the continuous attention and control of the operator; i. e. they cannot conveniently hold an object in a stationary suspended position while observations or measurements are being made, without the operator also maintaining his position. Thus, manipulation by these devices must be tedious and fatiguing, factors which introduce a severe element of risk when operations are of a hazardous nature. It is desirable for an operator to be able to stop, to view the instrument's position from various angles for perspective, and then to proceed by increments at a rate which he can control with confidence.

For these and similar reasons these devices cannot be regarded as the most desirable because their operation is based upon mechanical linkages and is restricted by the necessarily limited versatility of the control mechanism and also by the limited flexibility of the human hand which they try imperfectly to duplicate. On the contrary, it is desirable to have a remote control manipulating device actuated by electrical means so that the control unit and the manipulating unit are separately and easily transportable. Also it is desirable to arrange the relative positions of the control unit and the manipulating unit so that the manipulating unit can be employed in places to which power or control cannot readily be transmitted mechanically. It may be presumed to be possible in the cases of both the above devices to interpose between the manipulator and the controller a flexible linkage to replace the rigid connection described. This could be done with selsyn motors, connected of course with electric lines, or with hydraulic cylinders connected with fluid lines, or with flexible cables. It is clear however that more of these artifices would alter the conditions of direct mechanical linkage between the manipulator and the controller.

The present invention fulfills the above recited prerequisites and surpasses them in that it provides a manipulator that may be entirely electrically operated from a remote point and suffers from none of the limitations which have been mentioned in connection with the two above described devices. The manipulator can be operated by a separate unit which transmits power to it in any desired manner. The device of the instant invention can be made to perform all of the operations that can be performed with the human arm as well as operations which would be incapable of performance with the human arm. It can be made to perform double jointed movements and large angle deflections of its elements which cannot be duplicated by the human arm. It is fundamentally different from a set of tongs because it can be directed to perform a complicated series of movements which the operator at the controls supervises but does not himself perform.

It can perform operations at any rate and in any manner which the operator chooses and each operation can be controlled with any degree of precision which the operator desires by independently reducing or increasing the speed of the separate elements moving in their respective degrees of freedom. Since each of the movable elements of the manipulator forming the subject matter of the present invention may be moved independently, delicate operations may be performed by incrementally moving one element at a time about its pivotal joint while all other movable elements of the apparatus remain automatically relatively fixed.

The apparatus of the instant invention is extremely versatile in that the hand of the manipulator is provided with gripping members which may be adjutsed to the position of the object being handled with respect to the axis of rotation of the hand. Thus, for example, in pouring one can hold the lip of the vessel stationary while rotating the body of the vessel or in holding a screw driver one can make the blade stay in a screw slot during rotation of the screw driver. This is made possible by adjusting the span of the hand by moving one set of digits which oppose a movable thumb in a manner that will align the object to be manipulated with the axis of rotation of the hand. Novel arrangements have been provided for actuating the grasping digits of the hand whereby any desired pressure can be exerted by the digits on the object being grasped at the will of the operator through the medium of the novel control provided for the manipulator.

The elements comprising the arm of the manipulator have been designed with enough degrees of freedom of movement that the arm can not only reach every point within its working space, but it can approach every point from any direction and with the hand inclined at any desired angle. For example, the manipulator is able to seize a beaker so that its pouring lip is in the proper position; it is able to turn a stop-cock which requires that approach be made exactly along its axis of rotation; and in conjested areas, the manipulator is able to move along whatever paths are accessible.

An additional advantage which the manipulator of the present invention has over those of the prior art resides in the fact that, in performing remote operations such as a chemical experiment requiring the manipulation of numerous pieces of apparatus, no elaborate prearrangement of the apparatus is necessary prior to each experiment. The manipulator can arrange its own apparatus. This is true for the above reasons together with the fact that it can, as a unit, be translated with ease to any portion of the desired working area as by a trolley so that a very large space is accessible to it, and is therefore able to perform operations of an infinite variety. In fact, the manipulator is capable of propelling itself into and out of dangerous areas as, for example, to reach out of a door to be given supplementary or replacement items with which to work, or to submit to adjustments or repairs.

An additional important feature of the present invention resides in the provision of means for automatically maintaining the orientation of the hand with respect to a plane while performing a series of complicated movements, as, for example, the manipulator can pick up a filled beaker of liquid, raise it to any height within the range of the arm of the manipulator, extend it or retract it from a given position while raising or lowering the beaker without tilting the beaker. The ability to make large excursions of movement with an object while maintaining the position of the hand with respect to the horizontal is essential to the ease and safety of many operations. The position of the hand of the manipulator is adjustable both with respect to the horizontal and with respect to its own longitudinal axis. However, unless these adjustments are conscioulsy varied the hand of the manipulator maintains its original orientation regardless of the movements of other elements of the arm of the apparatus with respect to each other or as a whole. This independence of the separate degrees of freedom is achieved by the provision of a novel arrangement of elements such that the elements can be caused to move separately or simultaneously while maintaining a selected relationship with each other.

Another important feature of the present invention is the provision of a novel controller whereby an operator can cause the manipulator to perform the numerous operations of which it is capable. This controller is so arranged and designed that an operator by normal movement of his arm and hand can make and break electrical circuits as well as vary elements within the circuits to cause the manipulator to operate in a manner similar to the movement of the operator's arm and hand, and at the same time accomplish the movements at any velocity desired by the operator. For example, if the operator desires to cause the element of the manipulator which corresponds to the forearm of the operator's arm to move in a given direction, then the operator must operate controls by moving his own forearm in the desired manner. The speed at which the element of the manipulator, corresponding to the operator's forearm, will move in the direction that the operator's arm moves is controlled by the magnitude of displacement of the operator's forearm from a neutral position. Similarly, other elements of the manipulator corresponding to the digits of the human hand, the wrist, forearm, and upper arm, as well as the azimuthal orientation of the manipulator may be caused by the operator, through the medium of the novel control and appropriate electrical circuits, to operate in any desired manner at any desired speed. A further important feature of the novel control device is the provision of actuating elements which when released by the operator automatically assume a neutral position which causes the manipulator to come to a complete stop regardless of what operation is being performed thereby at the time the operator released the controls. The manipulator will then maintain the position that it was in at the time that the operator released the controls until the operator consciously operates the control device. When the manipulator is operated by electric motors, this feature may be achieved by the use of non-reversing elements such as spur and worm gears which eliminate the necessity of providing braking elements that would have to be brought into operation to maintain the elements of the manipulator in their operated position. As an adjunct to the controller there is provided means whereby the pressure exerted by the digital elements of the manipulator may exert any desired pressure on the object being manipulated and will continue to exert the pressure selected by the operator after the operator has released the controls and allowed them to automatically assume the neutral position.

A still further feature of the present invention is that it makes remote operations possible by the use of industrial television. The only prerequisite is that electrical conductors extend from the controller and observation unit to the manipulator and its associated television camera. This feature enables a single observer to supervise and control a plurality of different continuous processes that are being simultaneously carried out at remotely located, spaced points, as well as many less elaborate acts.

The principal object of the present invention is to provide a method and apparatus whereby an operator positioned at a given point can, through the medium of adequate controls and electrical transmission facilities, perform a series of operations with a dexterity comparable to that of a human arm, while supervising the operations.

This invention further contemplates the provisions of apparatus for accomplishing the principal object of this invention embodying all of the novel features enumerated above.

Other objects and advantages of the present invention will become apparent from the following detailed description when considered with the drawings in which:

Figure 3 is an enlarged side elevation of the manipulator partly shown in fragmentary section;

Figures 4A, 4B:
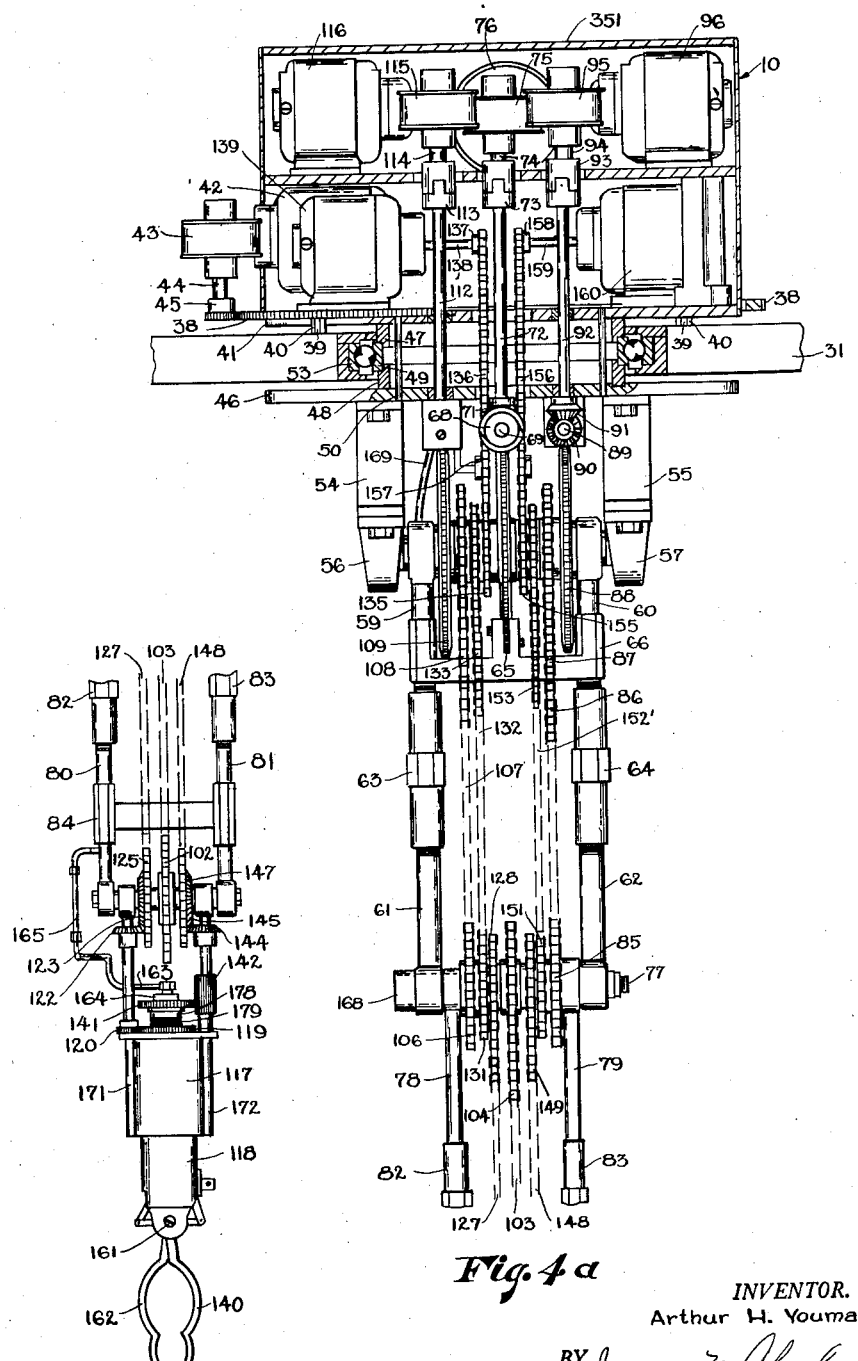

Figures 4a and 4b, taken together, are an enlarged front elevation of the manipulator in a different position from that of Figure 3, shown partially in fragmentary section;

Figure 5 is an enlarged detailed front view of the three joints of the arm portion of the manipulator shown partly in vertical section;

Figure 6 is an enlarged detailed view, shown partly in vertical section, of the assemblage of elements comprising the free end of the manipulator which substantially corresponds to the wrist and hand of a human being.

Figure 8A:
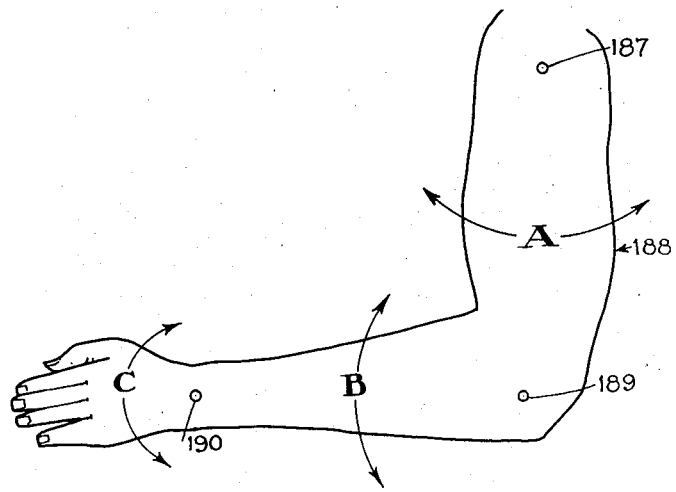
Figure 8B:
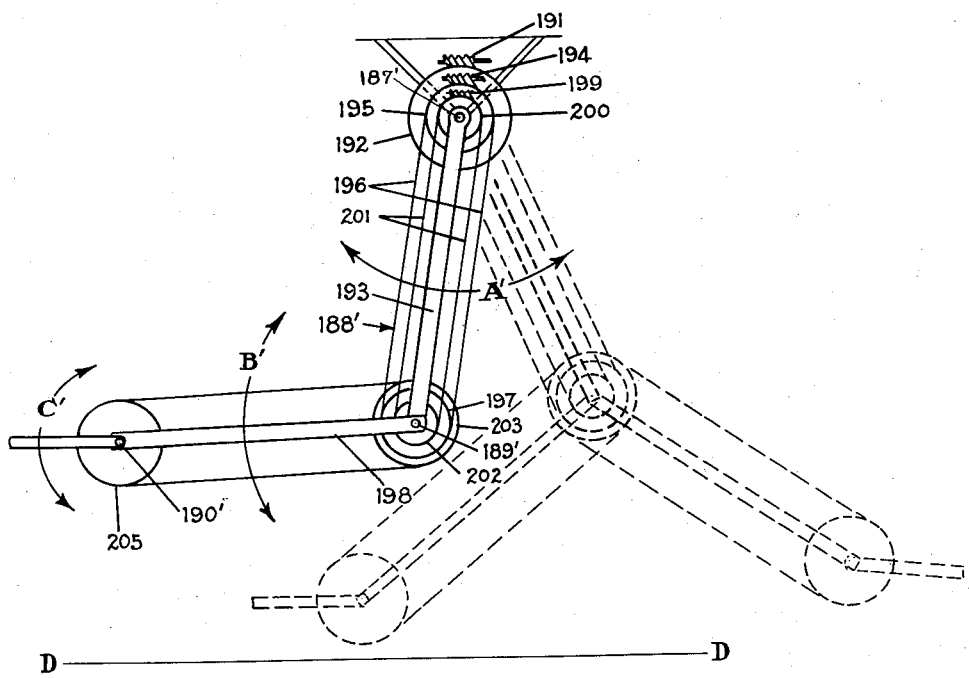
Figure 9:
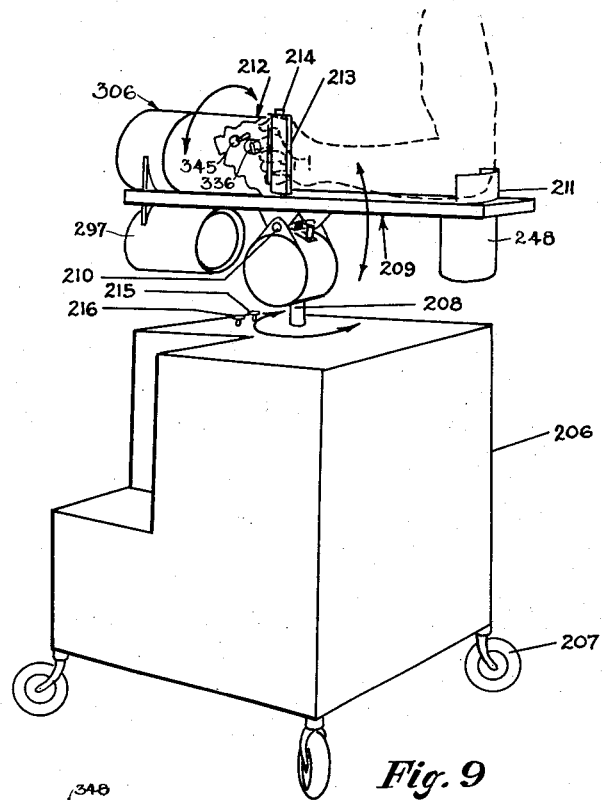
Figure 19:
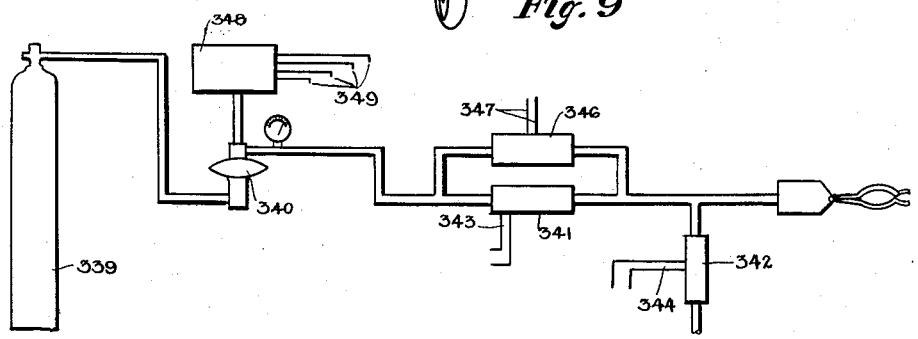
Figure 15:
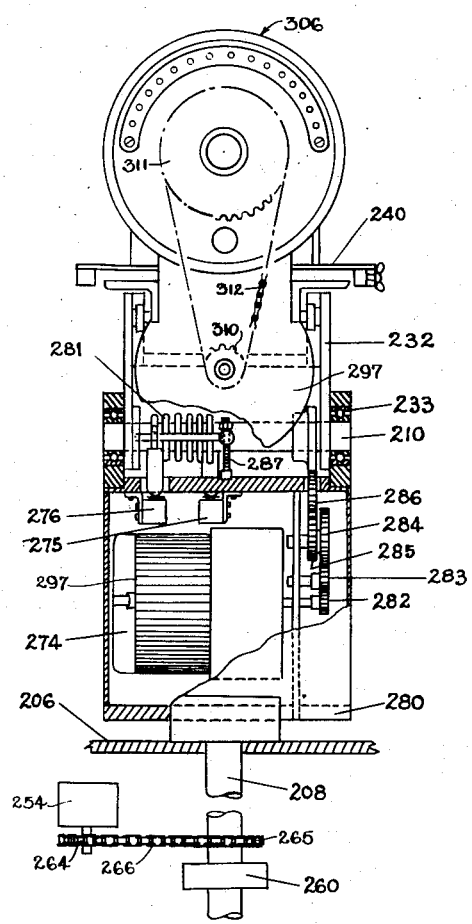
Figure 14:
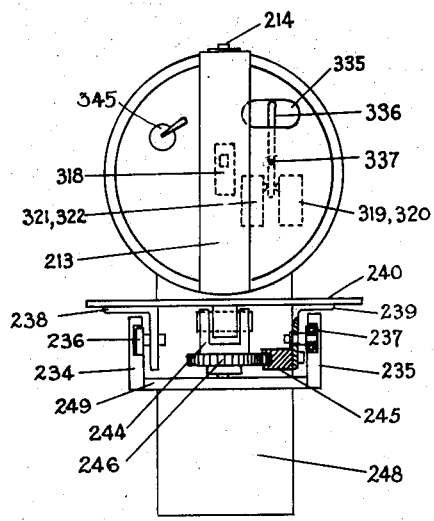
Figure 11:
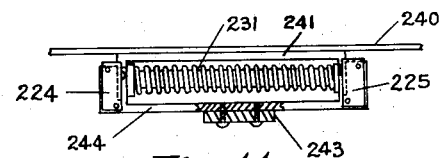
Figure 12:
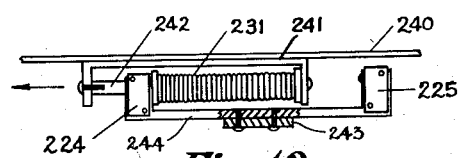

Figure 7 is an enlarged detailed top view of the assemblage of elements of Figure 6, shown partially in fragmentary section;

Figures 8a and 8b taken together illustrate the degrees of freedom of the manipulator as compared to those of the human arm;

Figure 9 is a perspective view of the controller for the manipulator showing in dotted lines a hand and arm associated therewith in operative position;

Figure 10 is a schematic circuit diagram of a typical circuit employed for moving and controlling the movement of a single element of the manipulator;

Figure 11 is an enlarged side elevation of one of the switching arrangements for actuating and controlling the movement of one element of the manipulator shown as it appears when the controller is in neutral position;

Figure 12 is an enlarged view of the assemblage of elements shown in Figure 11 as it may appear when the controller is actuated;

Figure 13 is an enlarged side elevational view of the controller actuating element shown partially in fragmentary vertical section;

Figure 14 is an enlarged back elevational view of the actuating element shown partially in vertical section with the elbow stop element removed;

Figure 15 is an enlarged front elevational view of the actuating element shown in Figure 13, taken partly in vertical section;

Figure 16 is a schematic wiring diagram showing the electrical circuits and elements utilized in operating the manipulator and controlling the operation thereof;

Figure 17 is an enlarged plan view of the circuit making and breaking elements which control the azimuthal orientation of the manipulator;

Figure 18 is an enlarged vertical elevation of the circuit making and breaking means which control the rotary movement of the assemblage of elements of the manipulator which corresponds to the lower arm of a human being; and Figure 19 is a diagrammatic illustration of a system whereby operation of the thumb of the manipulator may be effected and the pressure exerted by it in seizing an object can be controlled.

Figure 1:
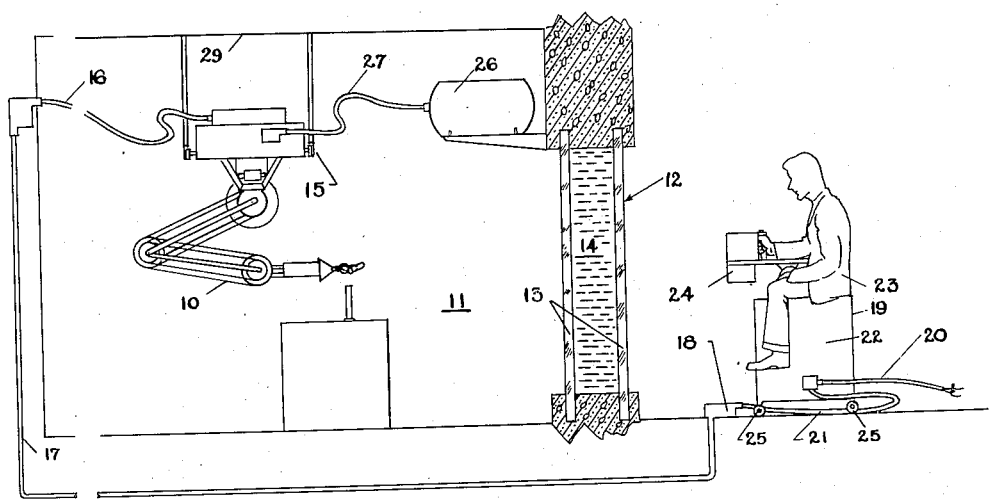
Figure 1 is a schematic illustration of one application of the instant invention showing the manipulator, transmission media, the controller, and an operator at the controller.

Referring to the drawings in detail, particularly to Figure 1, there is illustrated schematically an application of the instant invention as it would be used in conducting a chemical experiment of the type which would involve handling and pouring from test tubes, beakers, and similar objects. In this illustration the manipulator 10 is shown disposed within a room 11 which is provided with a window 12 that is so constructed that it forms a transparent barrier between the operator and manipulator. This barrier may comprise parallel thick sheets of glass 13 that are spaced from each other to provide a space 14 which may be filled with a suitable liquid. The manipulator 10 is shown mounted upon a track comprising rails 15 and 15' which may be suspended from the ceiling of the room 11. These tracks may run the entire length of the room in a direction parallel to the window 12, or they may be so disposed that the manipulator may travel to any desired point in the room. Manipulator 10 may be powered electrically through suitable power transmission conductors which may be enclosed within a flexible cable 16 and the conduit 17 which leads to a junction box 18 disposed adjacent the controller 19. Power may be supplied through conductors 20 through the controller 19 and flexible cable 21 to the junction box 18 in which connection is made to the conductors within the conduit 17. Controller 19 includes housing 22 which, in addition to housing electrical conductors and elements, may serve as a seat for an operator 23. A controller actuating element 24 is carried by the housing 22 and so arranged that that portion of the operator's arm from the elbow to and including the hand rests upon it and engages it in such a manner that operation of the controller actuating element 24 can be accomplished. The controller 19 is preferably mounted on wheels 25 that may be powered, at the will of the operator, to move the controller in such a manner that the operator can view to the best advantage and control the operations being carried out by the manipulator 10. Obviously the wheels 25 may or may not be adapted to move along a track.

In that form of the invention illustrated in Figure 1, the grasping claws or digits may be actuated and controlled by pneumatic means. Fluid, such as air, for the operation of the pneumatic means may be stored in a tank 26 and conducted to the manipulator 10 by a flexible nose 27.

Figure 2:
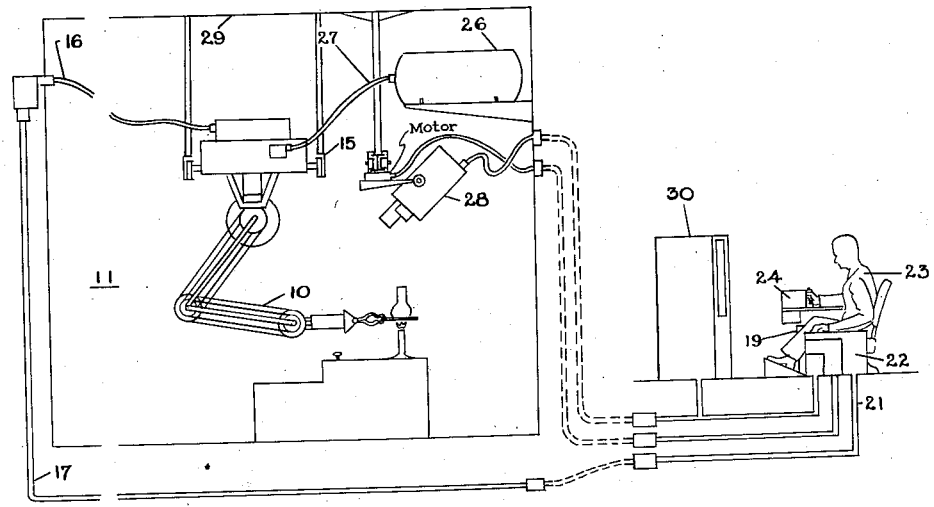
Figure 2 is an illustration of a modification of the invention performing an operation similar to that disclosed in Figure 1 but differing therefrom in that the operator is positioned on one side of an opaque barrier and the manipulator is positioned on the opposite side, and the operator utilizes television to supervise the operations caused to be carried out by the manipulator.

A modified form of the invention is illustrated in Figure 2. This form of the invention differs from that shown in Figure 1 in that no transparent barrier is needed between the operator 23 and the manipulator 10. In this form of the invention advantage is taken of industrial television. A television camera 28 is shown affixed to the ceiling 29 of the room 11. Obviously, the camera 28 can be made to follow excursions of the manipulator 10 across the room by mounting it upon suitable tracks which parallel those on which the manipulator 10 moves. The operator 23, illustrated in Figure 2 as being adjacent the room in which operations are being performed with the manipulator 10, is provided with a television receiver 30. Although the operator is shown adjacent to the room 11, it is obvious that he could be remotely located with respect to room 11, in fact the operator could be in a different city. The television receiver 30 and controller 19 are, of course, provided with suitable electrical conductors which connect them with the television camera 28 and manipulator 10.

As shown in Figures 3 and 4, the manipulator 10 is carried by a chassis 31 provided with wheels 32 and 33 that are adapted to engage the rails 15 and 15'. Chassis 31 may be rectangular in shape and be provided with four wheels. At least one of the wheels 32 that is adapted to run on the rail 15 is provided with an annular ring gear which engages a pinion 34. Pinion 34 is driven through shaft 35 by a reversible electric motor 36, which receives its power in a manner to be described in detail subsequently. In order to prevent slippage between the driven wheel 32 and the rail 15 there is provided along the length of the rail and secured to the side thereof a rack gear 37, along which the annular ring gear carried by or made integral with the wheel 32 is adapted to travel. Arranged in this manner the manipulator 10 may have translatory motion imparted to it to cause it to move along the track, as desired, throughout its entire length.

In order that the manipulator 10 may be azimuthally oriented there is provided on chassis 31 a large ring gear 38. Ring gear 38 is secured to the chassis 31 by means of bolts 39. The ring gear 38 is spaced from the chassis 31 by spacers 40 which surround the bolts 39. Mounted on the chassis 31, but inside of the ring gear 38, is a bed plate 41. One function of the bed plate 41 is to serve as a support for an electric motor 42 that is adapted to drive, through suitable gearing within the housing 43, a shaft 44 which in turn drives a pinion 45 that engages the ring gear 38. Bed plate 41 is, as shown, mounted above the chassis 31. There is provided below the chassis 31 a similar plate 46 which is parallel to plate 41 and spaced therefrom by collars 47 and 48 and a ball race 49. The ball race is positioned in annular grooves formed in the outer edges of adjacent faces of the collars 47 and 48. Collars 47 and 48 are caused to clamp the ball race 49 by means of bolts 50. Plate 41 is secured to collar 47 by means of screws. Plate 46 is secured to the collar 48 by means of screws. The assemblage of elements comprising plate 41, collar 47, ball-bearing race 49, collar 48, and plate 46, rotatably engages the chassis 31 through the ball-bearing assembly 53. Arranged in this manner rotation of pinion 45 by the motor 42 will effect rotation of the bed plate 41 with respect to the chassis 31. Motor 42 is preferably of the reversible type and is supplied with power in a manner to be described subsequently.

The assemblage of elements comprising plates 41 and 46, collars 47 and 48, and ball race 49 effectively serve as a support for the operating elements of the manipulator 10. The manipulator as described thus far is capable of translatory motion in that it can traverse the track formed by the rails 15 and 15', and is capable of rotary motion about a central vertical axis to orient the manipulator in any desired direction.

Suspended from the bottom plate 46 of the above described support are bearing hangers 54 and 55 which carry at their lower ends respectively bearings 56 and 57. A shaft 58 whose axis corresponds to the shoulder joint of a human being is journaled in the bearings 56 and 57. Shaft 58 has secured thereto a framework which corresponds to the upper arm of a human being. This framework comprises tubular elements 59 and 60 which are secured to similar tubular elements 61 and 62 respectively by means of turnbuckles 63 and 64 respectively. This framework is connected together and to the spur gear 65 by means of a bracket 66 which engages at its opposite ends tubular elements 59 and 60 and at a point substantially at its center the spur gear 65. Bracket 66 may be secured to the spur gear 65 by screws or bolts 67. Spur gear 65 is mounted on the shaft 58 at a point near its center and is adapted when motivated by the worm gear 68 to drive the spur gear 65 and the tubular framework described above. The worm gear 68 is keyed to a shaft 69. In addition to the worm gear 68 there is mounted on the shaft 69 a bevel gear 70 that is adapted to engage a similar bevel gear 71 carried by the lower end of shaft 72. Shaft 72 engages at its upper end a flexible coupling 73 which connects shaft 74 thereto. Shaft 74 leads to the gear box 75 associated with the electric motor 76. Electric motor 76 may be of the reversible type in order that the tubular framework described above and which corresponds to the upper arm of the human being may be moved in either direction about the shaft 58 as a pivotal axis through an angle of at least 180°. The tubular framework described above will hereafter be referred to as the upper arm of the manipulator.

Journaled in bearings formed in the lower ends of tubular members 61 and 62 is a shaft 77. Shaft 77 serves to connect the upper arm of the manipulator with a tubular framework which is comparable to the lower arm of a human being. This framework will hereafter be referred to as the lower or forearm of the manipulator. The lower arm comprises tubular members 78 and 79 which are secured to like tubular members 80 and 81, respectively, by means of turnbuckles 82 and 83, respectively. The upper tubular elements 78 and 79, as shown in Figure 5 fixedly engage shaft 77 so that rotation of shaft 77 will effect a movement of the lower arm about the axis of shaft 77. In order to give the lower arm of the manipulator rigidity the lower tubular elements 80 and 81 are rigidly connected to each other by means of the bracket 84. In order to effect rotation of the lower arm about the axis of shaft 77 the upper end of tubular member 79 has secured to the inner face thereof a sprocket wheel 85. Sprocket wheel 85 is driven by a chain 86 which spans the upper arm of the manipulator. Chain 86 is driven by a sprocket wheel 87 which is concentrically secured to a spur gear 88. Sprocket wheel 87 and spur gear 88 are mounted for rotation on the shaft 58, which forms to the shoulder joint of the manipulator. Spur gear 88 in turn engages a worm gear which would normally be keyed to the shaft 89 and tangentially engages the top of the spur gear 88. The arrangement of the worm gear with respect to the spur gear 88 is identical to that of worm gear 68 with respect to the spur gear 65. It is not shown in Figure 4a in order that the bevel gears 90 and 91 may be seen. Bevel gear 90, being keyed to the shaft 89, is driven by the bevel gear 91 which in turn is keyed to a shaft 92. Shaft 92 extends upwardly in a vertical direction to a flexible coupling 93. Flexible coupling 93 is driven by a shaft 94 which connects at its upper end to a gear box 95. The gear box 95 is in turn connected to the electric motor 96. Motor 96 is of the reversible type and receives its power in a manner to be described subsequently. Rotation of the motor 96 effects through the elements enumerated above a rotation of the lower arm about the axis of shaft 77, the angle of rotation being limited by engagement of the lower arm with the upper arm when the lower arm has been rotated to its extreme position in either direction. The bottom ends of the tubular members which make up the lower arm of the manipulator are provided with bearings 97 and 98 in which a shaft 99 is adapted to rotate. Shaft 99 serves as a support and axis of rotation for that portion of the manipulator 10 which corresponds to the hand of the human being. In fact, the shaft 99 and the bearings 97 and 98 function to simulate the wrist joint in a human being. The upper part of the hand of the manipulator comprises rod like members 100 and 101, the upper ends of which engage the shaft 99 in keyed relationship thereto. With this arrangement rotation of shaft 99 effects a rotation of the hand of the manipulator about the axis of shaft 99. This rotation is effected by a sprocket wheel 102 which is mounted on and keyed to shaft 99. Sprocket wheel 102 is driven by a chain 103 which spans the lower arm of the manipulator. Chain 103 is driven by a sprocket wheel 104 which is keyed to a sleeve bearing 105 that is adapted to rotate on the shaft 77. The sleeve bearing 105 and sprocket wheel 104 are driven by a sprocket wheel 106 which is also mounted on and keyed to the sleeve bearing 105. Sprocket wheel 106 is driven by a chain 107 which spans the upper arm of the manipulator. Chain 107 is in turn driven by the sprocket wheel 108 that is mounted for rotation about the axis of shaft 58. Sprocket wheel 108 is concentrically secured to a spur gear 109 by means of appropriate screws or bolts 110. The spur gear 109 and sprocket wheel 108 are provided with a common sleeve bearing 111 which is interposed between the shaft 58 and the unit comprising the sprocket wheel 108 and the spur gear 109. Spur gear 109 is driven by the shaft 112 through the medium of a worm gear and bevel gears in the same manner as described in connection with the spur gears 65 and 88. Shaft 112 extends vertically upward to a flexible coupling 113 which connects it to the shaft 114. Shaft 114 at its upper end is connected through appropriate gears contained in the gear box 115 to the rotor of the electric motor 116. Electric motor 116 is of the reversible type and is supplied with power in a manner to be described subsequently. By means of the system of gears, sprocket wheels and endless chains described immediately above the motor 116, when energized, will effect rotation of the hand of the manipulator about the axis of shaft 99 limited only by contact between the hand and forearm of the manipulator in either of the extremes of displacement.

Rod like members 100 and 101, forming a part of the hand of the manipulator, are secured at their lower ends to a housing 117. Housing 117 functions as a bearing for a cylindrical element 118 which is adapted to rotate in the bearing about its longitudinal axis. Element 118 has secured to its upper end a ring gear 119. Ring gear 119 is adapted to be driven by a pinion gear 120. Pinion gear 120 is secured to or made integral with sleeve 121 which is rotatably mounted on the rod like member 100. The upper end of sleeve 121 carries a bevel gear 122. Bevel gear 122 may be secured to the sleeve 121 in any appropriate manner. Bevel gear 122 is adapted to be driven by a bevel gear 123 that is mounted on a bearing 124 which in turn is mounted on the shaft 99. Bevel gear 123 is concentrically secured to a sprocket wheel 125 by means of appropriate screws 126. The sprocket wheel 125 is driven by an endless chain 127 which spans the forearm of the manipulator. Chain 127 is driven by a sprocket wheel 128 which is rotatably mounted as by ball-bearings 129 on the sleeve bearing 105 which surrounds the shaft 77. Concentrically secured to sprocket wheel 128 by means of appropriate screws 130 is a second sprocket wheel 131. Sprocket wheel 131 is adapted to be driven by an endless chain 132 which spans the upper arm of the manipulator. Chain 132 is driven by a sprocket wheel 133 which, through the medium of ball-bearings 134, is rotatably mounted on the shaft 58. Sprocket wheel 133 is secured to a sprocket wheel 135 which shares the bearing 134 with it. Sprocket wheel 135 is driven by an endless chain 136 which extends vertically upward through the bed plate 41 to a sprocket wheel 137 which is secured to a shaft 138. Shaft 138 is driven by an electric motor 139 through a gear box that contains a conventional spur and worm gear. Motor 139 is of the reversible type and is supplied with power in a manner to be described subsequently. Rotation of the rotor of motor 139 will through the linkage described immediately above, produce rotation of the cylindrical element 118 about its own axis. Element 118 is not restricted in its angle of rotation and can be caused to turn as many revolutions as is desired in either direction. The hand of the manipulator is provided with digits. Of these digits, the elements 140 correspond to fingers of the human hand. Fingers 140 are actuated in a manner to be described in detail later by a gear 141. Gear 141 is adapted to be driven by an elongated pinion gear 142 that is secured to or made integral with a sleeve 143. Sleeve 143 carries adjacent its upper end and affixed thereto a bevel gear 144. The assembly comprising gear 142, sleeve 143, and bevel gear 144 is driven by a bevel gear 145 that is mounted on a sleeve bearing 146 which surrounds shaft 99. Concentrically secured to bevel gear 145 by screws is a sprocket wheel 147. Sprocket wheel 147 is adapted to be driven by an endless chain 148 which spans the forearm of the manipulator. Chain 148 is driven by a sprocket 149 that is rotatably mounted on the sleeve bearing 105 by ball-bearings 150. A second sprocket wheel 151 secured to sprocket wheel 149 by screws 152 shares the ball-bearing 150 with the sprocket wheel 149. Sprocket wheel 151 is driven by an endless chain 152' which spans the upper arm of the manipulator. Chain 152' is driven by sprocket wheel 153 which is rotatably mounted on the shaft 158 through the medium of ball-bearings 154. Mounted on the same ball race of ball-bearings 154 is a second sprocket wheel 155. Sprocket wheel 155 is driven by an endless chain 156 which passes over an idler gear 157 which serves to maintain the chain in proper vertical alignment and tension. A similar idler gear is provided for the chain 136 as shown in Figure 4a. Chain 156 is driven by a sprocket wheel 158 that is secured to the rotor shaft 159 of electric motor 160. Motor 160 is of the reversible type and is powered in a manner to be described later. Energization of motor 160 will, through the linkage described above, produce rotation of the fingers 140 about the shaft 161 to displace them relative to the longitudinal axis of the cylindrical element 118.

The digital element 162 corresponds to the thumb of the human hand and is adapted to be similarly displaced by rotation about shaft 161. The displacement of the thumb 162 is effected by pneumatic means to be described in detail later. A fluid, such as air, may be supplied by pneumatic means contained within the housings 117 and 118 by means of a conduit 163. Conduit 163 is connected to the hand by a swivel 164 positioned about the axis of gear 141. Conduit 163 is preferably of the rigid type and makes connection with a flexible conduit 165 which leads to a passageway 166 within tubular elements 80 and 78 that are connected together by the turnbuckle 82. The passageway within tubular element 78 communicates with the bearing carried by the upper end of this tubular element 78 by an appropriate boring 167. Since the framework corresponding to the lower arm of the manipulator is keyed to the shaft 77 for rotation therewith a passageway is formed, as by boring, in the shaft 77 which communicates with the boring 167. The upper end of the passageway thus formed terminates in a chamber formed by a cap element 168 which fits over the end of shaft 77 and is secured to the bottom end of tubular element 61 by screws not shown. The chamber formed by the cap 168 communicates with the interior of tubular members 61 and 59 and the turnbuckle 63. The interior of these elements serve as a passageway leading to the top bearing carried by the upper end of tubular element 59. Fluid under pressure is introduced into the passageway formed by the tubular elements 59 and 61 and their connected turnbuckle 63 from a source of supply, not shown, by a flexible conduit 169 and the passageway 170 formed in the bearing carried by the upper end of tubular element 59 and the shaft 58. It is to be understood that interposed between the source of fluid supply and the conduit 169 are appropriate control regulators and valves which are electrically operated in a manner to be described subsequently.

Referring to Figures 6 and 7 a detailed description of the mechanical construction and operation of the hand of the manipulator will follow. In order to strengthen and render the hand more rigid there is provided truss elements 171 and 172 both of which are more clearly seen in Figure 4. These truss elements are made integral with the bearings carried by the upper ends of the rod-like elements 100 and 101 respectively. The outer ends of the truss elements are secured to the housing 118 by means of screws 173 which extend through spacer elements 174. The spacer elements 174 are provided to support the housing 117 in proper alignment with the other portions of the manipulator.

The digital elements 140 are constructed substantially in the form of bell cranks which are adapted to rotate about shaft 161. Each of the elements 140 are pivotally connected by links 175 to a cylindrical casting 176 by screws 177.

Cylindrical casting 176 is rotatably secured within the end of a piston-like casting 178 that is adapted to slidingly engage the inner wall of the cylindrical element 118. The casting 178 is provided at its opposite end with an elongated portion of reduced diameter having external threads 179 thereon. Threads 179 are adapted to engage internal threads provided in that end of the housing 118 farthest from the digital elements.

In order to displace the casting 178 in a direction along its axis there is secured to the outer end thereof the gear 141. Since the gear 141 is fixed to casting 178 it will be translated along the axis of the hand when the gear is rotated, which is the reason for making the gear 142 elongated. It therefore becomes apparent that when gear 141 is rotated by the elongated gear 142 the threads 179 will cause the casting 178, which rotatably engages the cylindrical casting 118, to actuate the fingers 140. The position of the fingers 140 can therefore be varied at the operator's will to accommodate any size object that it is desired to grasp with the manipulator.

Digital element 162 which corresponds to the thumb of the human hand and which opposes the finger 140 in grasping an object is identical to the fingers 140. The thumb element pivotally engages the shaft 161. The end of the bell crank opposite the thumb portion is secured through mechanical linkage, which consists of elements 180 and 181, to actuating rod 182. The opposite end of the actuating rod pivotally engages the piston 183 which is adapted to move in a cylinder formed by the inner wall of the casting 178.

One end of spring 184 pivotally engages the swivel 164. The opposite end of spring 184 is secured to the piston 183. The tension of the spring is so regulated that it tends to urge the piston in a direction such that it will tend to hold the thumb in an extended position. The spring 184, for a portion of its length, is provided with a housing 185. Housing 185 is made integral with or secured to piston 173 and acts as a guide for the piston. Housing 185 is provided with calibrated orifices 186 so that fluid communication may be established between the chamber which houses the pivotally secured end of spring 184 and the chamber to the left of piston 183 as shown in Figure 7. These orifices are calibrated so that the speed with which the pressure is built up on the piston 183 may be regulated to control the speed with which the thumb moves in grasping an object.

In operation fluid is admitted into the chamber which houses the pivoted end of spring 184 and pressure will be built up against the piston 183 to urge it forward and move the thumb toward the fingers to grasp an object. The force with which the thumb will exert pressure on an object may be controlled by controlling the pressure of the fluid admitted to the chambers of the hand.

Although the digital elements 140 and 162 corresponding to the thumb and fingers of the manipulator have been shown as having a particular shape it is obvious that they can be given any shape required for the performance of a particular operation. Referring to Figures 8a and 8b of the drawings the degrees of freedom of the manipulator 10 will be compared to those of the human arm. In Figure 8a, a pivotal axis 187 corresponds to the shoulder joint of an arm 188. Pivotal axis 189 corresponds to the elbow joint of the arm 188. Arrow A indicates a degree of freedom of the arm in that it signifies that the upper arm is capable of movement in the direction indicated by the arrow A about the pivotal axis 187. Similarly, arrow B indicates a second degree of freedom of the arm in that it signifies that the lower arm is capable of movement about the pivotal axis 189. Arrow C indicates that the hand can pivot on the pivotal axis 190. The pivotal axes 187, 189, and 190, are to be understood to be axes that are perpendicular to the plane of the drawing and all movements of the arm referred to in connection with these figures lie in the plane of the drawing. Corresponding reference characters having primes, and the arrows in Figure 8b refer to analogous parts of the mechanical manipulator 10 forming in part the subject matter of this invention. It is obvious from a comparison of Figure 8a and Figure 8b that all movements of the elements of the arm about the indicated axes are capable of being duplicated by the manipulator. In Figure 8b the dotted lines indicate the manipulator in different positions of operation.

The alternate positions of the manipulator as indicated by the dotted lines in Figure 8b illustrate that it can be made to duplicate the degrees of freedom of the arm when moved in the plane of the drawings as well as perform movements incapable of achievement with the human arm. This latter is true because as has been previously shown the maximum angle of rotation of the elbow and wrist are not restricted to as small an angle as are the lower arm and hand of a human being. Specifically referring to Figure 8b a description of the mechanics involved in flexing the joints of the manipulator will follow. If it is desired to produce rotation of the manipulator about the pivotal axis 187 which corresponds to the shoulder joint of the human arm, the worm gear 191 would be driven by a suitable motor. Worm gear 191 drives the spur gear 192 that is fastened to the framework 193 of the upper arm of the manipulator. This produces rotation of the upper arm of the manipulator in the plane of the paper about its pivotal axis 187'. The lower arm of the manipulator can be caused to rotate about the pivotal axis 189' by energizing the worm gear 194 by a suitable motor to drive a spur gear and the sprocket wheel 195. The endless chain 196 will transmit this rotation to the sprocket wheel 197 which is fastened to the framework 198 of the lower arm. In this manner the lower arm can be caused to rotate about its pivotal axis 189' independently of rotation of the upper arm about its pivotal axis 187'. The hand of the manipulator can be independently rotated about its pivotal axis 190' by energizing the worm gear 199 to drive a spur gear that may be attached to sprocket wheel 200. A chain 201 which passes over the sprocket wheel 200 will transmit rotation to a similar sprocket wheel 202. Sprocket wheel 202 is secured to a second sprocket wheel 203 which is adapted on rotation with sprocket wheel 202 to transmit the rotational movement by means of chains 204 to the sprocket wheel 205.

Thus far it has been shown that the elements of the arm of the manipulator may be moved independently about their respective pivotal axes. In the actual construction of the manipulator sprocket wheels 195 and 197 may be of the same diameter. Sprocket wheels 203 and 205 may also be of the same diameter but of a different diameter from sprocket wheels 195 and 197. Sprocket wheels 200 and 202 are similarly the same size but need not be the same diameter as either of the two above mentioned pairs. In Figure 8b these sprocket wheels have been shown in pairs having widely varying diameters in order that the mechanics of the operation of the manipulator may be illustrated and described.

The sprocket wheels and chains which drive the manipulator are so selected and arranged that rotation of the manipulator can be effected about the pivotal axis 187' without disturbing the respective orientations of the lower arm and the hand of the manipulator with respect to a selected reference plane D—D shown in Figure 8b perpendicular to the plane of the drawing. This novel construction of the manipulator renders this feature automatic.

The upper arm of the manipulator may be rotated about its pivotal axis 187' while the lower arm of the manipulator is being simultaneously rotated about its pivotal axis 189' by the simultaneous energization of worm gears 191 and 194. These movements of the two elements of the arm, although independent of each other, will not disturb the orientation of the hand with respect to the selected reference plane D—D. It is to be understood that either the upper arm or the lower arm may be moved independently without disturbing the orientation of the hand with respect to the selected reference plane. Additionally, it is obvious that movement of any element of the manipulator may be effected without disturbing the orientation of any other element or elements with respect to the reference plane D—D.

The degrees of freedom illustrated in the Figure 8b are such that the manipulator may be caused to reach substantially all points located in the plane of the manipulator. The provision of an independently controlled hand enables the manipulator to approach any object that it is desired to grasp with the hand from any desired direction. The field of operation of the manipulator is expanded from that which lies in a plane to that encompassed by a sphere by the provision of the novel support for the manipulator illustrated in Figures 3 and 4 which enables it to be rotated about a vertical axis through the pivotal axis 189'. This sphere of operations for the manipulator will obviously be extended by providing suitable tracks whereby translatory motion may be imparted to the manipulator. Such an arrangement of tracks is illustrated in Figures 1 and 2.

The operations of the manipulator as described immediately above are simply initiated and controlled by a novel controller illustrated in Figure 9. The movements of the controller required to initiate and control the operation of the manipulator will first be described without reference to the electrical circuits associated therewith. The controller comprises a cabinet-like housing 206 that may be supported by wheels 207. Wheels 207 may be of the type which require no track, or they may be flanged to operate on a track in order that the operator can follow the translatory movement of the manipulator.

Extending vertically from the top of cabinet 206 is a supporting shaft 208 that is adapted to pivotally support an arm rest 209. Shaft 208 is adapted to be rotated about its vertical axis. The arm rest 209 is adapted to be pivoted about a horizontal shaft 210. The arm of an operator is shown in dotted lines in operative position on the arm rest 209. There is provided on top of the arm rest 209, near the right end thereof, a stop element 211 adapted to engage the elbow of the operator's arm. Mounted upon and near the opposite end of the arm rest 209 is an assembly 212 of elements which includes a hand grip 213 and a plurality of associated switches. The assembly 212 is adapted to be rotated about an axis that is parallel to a longitudinal element of the plane of the arm rest 209. The arm rest 209 is adapted to move longitudinally in its own plane regardless of its position with respect to the pivotal axis through shaft 210.

With the operator's arm in the position shown in dotted lines in Figure 9 the controller can be operated by normal motions of the human arm to initiate and control similar movements by the manipulator 10. If it is desired to produce rotation about the axis 187', illustrated in Figure 8b, it is only necessary to move the arm rest 209 longitudinally. This operation completes circuits and, dependent upon the amount of displacement of the arm longitudinally, controls the speed with which the manipulator will rotate about the axis 187'. The direction of longitudinal displacement of the arm rest 209 determines the direction in which the manipulator will rotate about the axis 187'. In other words, if the operator moves his arm forward, the manipulator will extend its arm and if the operator moves his arm backwards, the manipulator will retract its arm, and the speed with which the manipulator will respond is determined by the amount of longitudinal displacement of the arm rest forward or backward respectively. This action of the operator's arm is a natural movement about the shoulder joint which tends to maintain his forearm oriented in a particular manner. The action of the manipulator follows this natural movement of the operator's arm and also tends to maintain its forearm in the selected manner of orientation unless the arm rest is deliberately moved in some other manner.

If it is desired to move the forearm of the manipulator about its pivotal axis 189' without moving the upper arm, it is only necessary for the operator of the controller to flex his forearm in a similar manner by pivoting the arm rest on the shaft 210 either forward or backwards depending upon the direction that it is desired to move the forearm of the manipulator 10. Again the amount of angular displacement of the arm rest about the shaft 210 determines the speed at which the forearm of the manipulator will rotate about its pivotal axis 189'. Movement of the forearm of the manipulator in the manner just described will not alter the orientation of the hand of the manipulator unless the operator consciously performs some other motion at the same time that he tilts the arm rest on its axis provided by shaft 210.

If it is desired to change the orientation of the hand, with respect to the horizontal, it is only necessary for the operator to place his thumb on the switch button 214 and press it down, which operation will complete electrical circuits whereby pivoting the arm rest about the shaft 210 will no longer effect rotation of the forearm but will effect a rotation of the hand about its pivotal axis 190'. Here again the speed with which the hand will rotate about its pivotal axis 190' is controlled by the amount of angular displacement of the arm rest about the shaft 210. This movement of the hand of the manipulator may be effected independently of the movement of the forearm or upper arm and also may be effected simultaneously with the movement of the upper arm. It is to be understood that the hand of the manipulator could also be rotated about its axis 190' simultaneously with the rotation of the lower arm of the manipulator by the provision of another electrical control circuit.

If it is desired to rotate the hand of the manipulator, for example to pour from a beaker grasped by the digits thereof, it is only necessary for the operator to displace his hand in a rotary manner as he grasps the grip 213. Such action will rotate the assembly 212 about its axis to complete electrical circuits which initiate rotation of the hand of the manipulator. The direction of displacement of the grip 213 will determine the direction of rotation of the hand of the manipulator and the speed at which the hand will rotate in that direction is determined by the angular displacement of the grip 213. As pointed out above in connection with the description of the detailed construction of the hand it can be caused to rotate as many revolutions in either direction as may be desired by the operator.

If it is desired to rotate the manipulator 10 about its own vertical axis, for example to reach an object located behind it, then it is only necessary to effect an angular displacement of the arm rest which will produce rotation of the shaft 208 about its own axis. The direction of the angular displacement of the arm rest will determine the direction of rotation of the manipulator about its own axis and the speed with which the manipulator will rotate will be determined by the amount of angular displacement of the arm rest.

As described above the field of operation for the manipulator is extended by mounting it upon suitable rails and providing a source of motive power for causing it to be translated along this track. To this end there is provided on the cabinet 206 a control 215 for completing electrical circuits which will power the manipulator and cause it to move in the desired direction as well as determine the speed at which it will move. A satisfactory switching arrangement has been provided whereby the actuating elements of the controller which normally produce rotation of the manipulator about its vertical axis can be used to produce translation of the manipulator along the track. With this arrangement of controls, if it is desired to cause the manipulator to move along the track, the operator first actuates the control switch 215 and moves his arm either in a clockwise or a counter-clockwise direction, depending upon the direction that he wishes the manipulator to move on the tracks. Here again the speed with which the manipulator will move along the tracks is controlled by the angular displacement of the arm rest 209. It is to be understood that it is within the skill of the art to provide separate control means for controlling the translatory motion of the manipulator.

The arrangement of the controller is such that the manipulator may best be operated when it is oriented in substantially the same position as the operator's arm. If, however, the manipulator is caused to move to such a position as could not be duplicated by the operator's arm, as for example, when the hand is rotated about the axis 190' shown in Figure 8b through an angle of approximately 180°, a forward movement by the operator's arm on the controller will no longer produce motion in the direction in which the hand of the manipulator is extended, but rather in a backward direction. That is, since the manipulator is substantially symmetrical in construction, the forward direction can only be related to the direction in which the hand of the manipulator is extended. Hence when the hand is caused to extend in this new direction the controls which operate the elements of the manipulator corresponding to the hand, lower arm and upper arm will function in a manner which is opposite in sense to the desired action. There has been provided on cabinet 206 a master switch 216 which when actuated will reverse the manner in which power is supplied to certain of the element-actuating motors so as to restore correlation between the movements of the elements of the manipulator with those of the arm of the operator. A reversal of the controls to motors 76, 96, and 116 is usually all that is necessary to restore correlation.

In certain operations it may become desirable to rotate the lower arm from the position shown in Figure 8b about pivot 189' through an angle of approximately 180° to extend the hand in a diametrically opposite direction. In order to perform operations with the hand in this new position it becomes desirable to have it move in correlation with the normal movements effected by the operator's arm. Under these circumstances the switching arrangement may be actuated to reverse the effect of the controller on one or more of the elements of the manipulator. Further details of the controller will be described in connection with the schematic wiring diagrams, a description of which follows.

Reference will first be made to Figure 10 of the drawings which shows a schematic wiring diagram of the electrical circuits and elements which are actuated to control rotation of the manipulator 10 about its shoulder axis. As pointed out above, the motor 76 which produces rotation of the upper arm of the manipulator about the shoulder axis is a reversible motor. It may be supplied with either alternating or direct current. For purposes of describing one form of electrical circuits adapted for the operation of this motor it will be treated as an alternating current motor. In the circuit diagram of Figure 10 the motor 76 is illustrated diagrammatically by a stator winding 217 and a rotor 218. The stator and rotor may be supplied with electrical power from a source not shown by means of conductors 219 and 220. These conductors are connected across the winding of a variable auto-transformer 221 and to points 222 and 223 of single-pole double-throw switches 224 and 225, respectively. The opposite terminals 226 and 227 of the single-pole double-throw switches 224 and 225 are connected together and through a fuse 228 to a center contact of a double-pole double-throw switch 229. The variable tap on the winding of the autotransformer is connected to the other central contact of the double-pole double-throw switch 229. An adjacent set of the outer contacts of the double-pole double-throw switch 229 is connected across the rotor 218. The other outer set of contacts of switch 229 are connected to effect, upon actuation of the switch 229, a reversal of the manner in which power may be supplied to the rotor 218 to cause it to rotate in the reverse direction. The center contact of switch 224 that is adapted to engage either the contact 222 or the contact 226 is connected through a fuse 230 to one side of the stator winding 217. The other side of the stator winding 217 is connected to the center contact of switch 225 and is adapted to make contact with either the points 223 or 227. Switches 224 and 225 may be of the type known commercially by the trade name "microswitches." These are actuated by the arm rest 209, shown in Figure 9, when the operator moves it longitudinally. These microswitches are shown in the enlarged fragmentary views illustrated in Figures 11 and 12. When the arm rest 209 as shown in Figures 11 and 13 is in the neutral position the spring 231 maintains the switches 224 and 225 in the actuated position shown in Figure 10. The motor circuits thus completed are not connected to the power supply and as a result motor 76 cannot be operated in either direction.

However, when the operator moves the arm rest 209 in the direction of the arrow as shown in Figure 12 the spring 231 disengages the switch 225 to cause it to make a circuit through contact 223 thereof to supply power to the rotor and stator circuits of the motor 76. When this switching action occurs the end of the winding of the variable autotransformer that connects to switch 225 is thereby connected through the stator winding 217 of the motor, fuse 230, and switch 224 which engages contact 226, the fuse 228, the switch 229, the rotor 218, and the variable tap of the autotransformer 221. The amount of power supplied to the motor is varied by moving the variable tap on the winding of the autotransformer to apply more or less voltage to the circuit. The extent to which the variable tap of the winding of the autotransformer is varied is a direct function of the longitudinal displacement of the control 209 which is shown in Figures 9 and 13.

Alternatively, when the controller is moved from the neutral position shown in Figures 11 and 13 longitudinally in the direction opposite to that indicated by the arrow in Figure 12, switch 224 is caused to engage contact 222. This completes a circuit from that end of the autotransformer which is connected to conductor 219 through the elements which include the fuse 230, stator winding 217, switch 225 which engages contact 227, fuse 228, switch 229, the rotor 218, and the central tap of the autotransformer winding. By means of the circuit thus completed the motor 76 will operate in the opposite direction to that described immediately above. Here again the speed at which the motor 76 will operate depends upon the longitudinal displacement of the arm rest 209 of the controller in the direction opposite to that indicated by the arrow in Figure 12.

The manner in which the variable tap on the winding of the autotransformer is moved is illustrated in Figures 13 and 14. In order to facilitate an understanding of the manner in which this is accomplished reference will be made to constructional details of the actuating element of the controller. This element comprises a support 232 that is provided with bearings 233 that are adapted to engage the shaft 210. Mounted on the supports 232 are elongated side elements 234 and 235. Longitudinal ways are milled in the inner surfaces of the side elements 234 and 235 to receive wheels 236 and 237 which support angle irons 238 and 239 that form a bed on which the top surface plate 240 of the actuating element is mounted. As pointed out in connection with Figure 9, assembly 212 is mounted on the forward end of the surface plate 240, and an adjustable elbow stop is mounted on the other end of the surface plate. As shown in Figures 11, 12, and 13 there is secured to the bottom of the surface plate 240 a substantially U-shaped element 241. The U-shaped element is located at substantially the center of the arm rest and has secured between the arms thereof a rod 242. Rod 242 has threaded thereover a spring 231 which in operation tends to maintain the arm rest in its neutral position. In fact, the strength of the spring 231 is so selected that it is capable of returning the arm rest to neutral position if it is released by the operator when it is in a displaced position. As shown in Figure 11, opposite ends of spring 231 rest against the microswitches 224 and 225 when the arm rest is in the neutral position and hold the microswitches in the actuated position indicated in the circuit diagram of Figure 10.

As shown in Figures 11 and 12 a cross-member 243 is connected between the lower edges of the side elements 234 and 235. Cross-member 243 forms a support for an inverted substantially U-shaped element 244. U-shaped element 244 serves a dual purpose in that it provides a support for the microswitches 224 and 225 and serves as an actuating member for compressing the spring 231 when the arm rest is displaced longitudinally.

Secured to the inner surface of angle iron 239 near the bottom edge thereof, and adapted to be moved with the angle iron, is a rack gear 245. Rack gear 245 is adapted to rotate a pinion gear 246 when the arm rest is displaced longitudinally. The pinion 246 is secured to the shaft 247 of a variable autotransformer 248. The shaft 247, in a conventional manner, operates the variable tap of the autotransformer. The autotransformer 248 is secured to a cross-member 249 that is connected between the bottom edges of side elements 234 and 235. Arranged in this manner movement of the arm rest in either longitudinal direction will rotate the pinion 247 to vary the position of the tap on the winding of the autotransformer 248. The actuating elements for the autotransformer are arranged in such a manner that the variable tap is at substantially the center of the winding when the controller is in the neutral position. With this arrangement equal maximum and minimum voltages are available for operating the motor 76 in either direction. A given displacement in the forward direction will result in the application of the same voltage to the motor 76 as an equal displacement in the backward direction but as pointed out above, the switching arrangement will control the direction of rotation of the motor.

Motors 36, 42, 96, 116, 139, and 160 are each energized and controlled by electrical circuits which are similar to those illustrated in Figure 10. Circuits for effecting and controlling the various movements capable of achievement by the manipulator are shown in the schematic wiring diagram of Figure 16. The electrical circuits shown in Figure 10 are included in the wiring diagram of Figure 16 and have assigned to the elements thereof the same reference characters used in Figure 10.

The electrical wiring system illustrated in Figure 16 is that of one form of controller that has been found to be satisfactory for the operation and control of the manipulator. In the wiring diagram the motor 42 is energized and controlled by an arrangement of elements and circuits that are similar to those described in Figure 10. This motor, when energized, produces rotation of the manipulator about its own vertical axis. Motor 42 is illustrated as having a stator 250 and a rotor 251 which are supplied with power from mains 252 and 253 through a variable autotransformer 254, microswitches 255 and 256, the reversing switch 257 and fuses 258 and 259. The microswitches 255 and 256 are disposed within the housing 260 shown in Figures 13 and 15 and are adapted to be operated by rotation of shaft 208. The manner of mounting the microswitches for operation by the shaft 208 may be as illustrated in Figure 17. Supports 261 and 262 are provided for the microswitches 255 and 256, respectively. These switches are actuated by the ends of a spring 263, when the controller is in the neutral position, to complete circuits in the manner illustrated in Figure 16. Spring 263 is of the coil type and is disposed about the shaft 208. This spring serves a dual purpose in that it actuates one or the other of the microswitches 255 and 256 upon rotation of the shaft 208 and also restores the controller to its neutral position when the operator releases it. The restoration of the controller to its neutral position is made possible by providing on the shaft suitable arms which engage the respective end portions of the spring 263 when actuating element of the controller is displaced to rotate shaft 208. The variable autotransformer 254 may be mounted on suitable supports within the cabinet 206 and driven through sprocket wheels 264 and 265 by a chain 266. Sprocket wheel 265 is secured to the shaft 208 and adapted to be rotated thereby. With this arrangement an incremental angular displacement of the controller in the plane of the arm rest actuates one of the microswitches 255 or 256 to complete power circuits to the motor 42, and further displacement of the controller in the same direction will increase the speed of the motor 42 which drives the manipulator about its own vertical axis. Since many operations performed by the manipulator do not require rotation of the manipulator about its own axis simultaneously with translation of the manipulator on the track comprising rails 15 and 15′, the motor 36 may be energized and controlled by the same movements of the controller that alternatively produce rotation of the manipulator about its own vertical axis. This is made possible by providing a double-pole double-throw switch 215. Switch 215 may be mounted in the top of the cabinet 206 where it will be accessible to the operator. When switch 215 has been thrown to the position required for the operation of motor 36 to translate the manipulator along its track, the rotor and stator circuits of motor 42 are broken and circuits made through the rotor 267 and stator 268 of motor 36. These new circuits completed through the rotor and stator of motor 36 are made through the fuses 269 and 270 and the reversing switch 271.

The motor 96, which produces rotation of the lower arm of the manipulator, is energized and controlled by means of electrical circuits and elements that are arranged in a manner similar to that described in connection with Figure 10. Motor 96 is illustrated as having a stator 272 and a rotor 273 which are supplied with power from mains 252 and 253 through a variable autotransformer 274, microswitches 275 and 276, reversing switches 277, and fuses 278 and 279. The microswitches 275 and 276 are mounted within a housing 280 mounted on the upper end of shaft 208 as shown in Figures 13, 15, and 18. Switches 275 and 276 are so arranged that the ends of a coil spring 281, disposed about the shaft 210, engage the actuating elements of the switches. Coil spring 281 serves a dual purpose in that it actuates the switches 275 and 276 and returns the actuating element of the controller to its neutral position when it is released and tends to hold it in this neutral position. With this arrangement of elements movement of the actuating element of the controller, when the operator flexes his elbow, actuates one or the other of the switches 275 or 276 to complete the electrical circuits through the rotor and stator winding of motor 96 to produce rotation of the lower arm of the manipulator 10 about its pivotal axis. The direction of rotation of the motor 96 is determined by the direction of rotation of the operator's lower arm about his elbow. The first incremental angular displacement of the actuating element of the controller energizes the motor and tends to cause it to start rotating, and further angular displacement of the actuating element in the same direction will supply additional power to the motor by moving the position of the tap on the autotransformer 274 in such a direction as to increase the applied voltage. In the construction of the controller, autotransformer 274 is mounted within the housing 280 and the variable tap actuating shaft is provided with a pinion 282 that is adapted to be driven through the gears 283, 284, and 285 by a sector gear 286. Sector gear 286 is secured to the shaft 210 and is adapted to be rotated thereby upon angular displacement of the actuating element of the controller. Stops 287 and 288 are also secured to the shaft 210 and in an adjustable manner limit the angular displacement of the actuating element of the controller so that extreme displacements of the controller will not injure the autotransformer. Details of the microswich operating elements and the spring 281 are shown in Figure 18. The actuating elements of the switches 275 and 276 engage push-rods 289 and 290. These push rods are provided with enlarged flat heads that are adapted to be engaged by the ends of the spring 281. In order to disengage the push-rods from the actuating elements of the microswitches when the spring is in either of the positions shown in dotted lines, there is provided a leaf spring 291 that is secured to the housing 280 by means of screws 292. This leaf spring is retained in flexed condition by the ends of spring 281.

In many operations that are capable of being performed by the manipulator, rotation of the wrist simultaneous with the rotation of the lower arm about its pivotal axis is not required. In Figure 16 there is illustrated electrical circuits and elements whereby the motor 116 may be energized and controlled by the same movements of the controller that alternatively produce rotation of the lower arm of the manipulator about its own pivotal axis. Motor 116 when energized produces rotation of the hand of the manipulator about its pivotal axis which is the axis of shaft 99 shown in Figure 5. This is made possible by the provision of a double-pole double-throw relay 293. This relay when energized by the winding 294 by operation of switch 214 breaks the rotor and stator circuits of the motor 96 and completes the rotor and stator circuits of the motor 116 in exactly the same manner as described in connection with reversible switch 215. Switch 214, as shown in Figures 9, 13, and 14, is located on top of the hand grip of the actuating element of the controller. When the operator closes switch 214 the motor 116 is energized and controlled in the same manner as described in connection with motor 96.

In Figure 16 the motor 139 which produces rotation of the hand of the manipulator about its own longitudinal axis is shown as having a rotor 295 and a stator 296. This motor is energized and controlled by electrical circuits and elements in the same manner as described in connection with Figure 10. The rotor and stator of motor 139 are supplied with power from mains 252 and 253 through a variable autotransformer 297, microswitches 298 and 299, reversing switch 300, and fuses 301 and 302. The microswitches 298 and 299 are mounted on suitable supports in the rotatable assembly 212 and are adapted to be actuated by means of coil spring 303. These microswitches are of the type illustrated in Figure 17 and are actuated by the spring in the same manner as described in connection with the microswitches disposed in the housing 260. The spring 303 is disposed about shaft 304 which is rotatably mounted in a bearing in the end wall 305 of the housing 306. Housing 306 is mounted on the forward end of the controller actuating element. The walls 305 and 307 of housing 306 support shaft 304 in suitable bearings. Shaft 304 extends through the wall 307 of the housing and has secured thereto the assembly 212. In order to raise the ends of the spring 303 from engagement with the actuating elements of the microswitches there is provided a saddle member 308 that is disposed over the coils of the spring but under the ends thereof. This saddle member is secured to the shaft 304 and also to the forward wall of the assembly 212. With this arrangement rotation of the assembly 212 about its own longitudinal axis by the hand grip 213 will actuate one or the other of the microswitches 298 and 299. Any rotation of assembly 212 will also place in tension the spring 303 in such a manner as to tend to restore the assembly 212 to a neutral position. Stops 309 are provided to limit the rotation of assembly 212. The arrangement described thus far actuates either switch 298 or 299 to energize the motor 139 to produce rotation thereof in the desired direction. Further displacement of the assembly 212 in the same direction will move the position of the tap on the autotransformer 297 to control the power supplied to the motor 139 and thereby control the speed of rotation of the hand of the manipulator about its own axis. Movement of the tap on the autotransformer is effected by sprocket wheels 310 and 311 and the chain 312, it being understood that sprocket wheel 311 is secured to shaft 304 for rotation therewith.

With the specific arrangement of the hand illustrated in Figures 6 and 7 an excessive number of revolutions of the hand in the same direction about its own longitudinal axis will produce a change in the position of the fingers 140 with respect to the longitudinal axis of the hand. In many operations this is not important for the reason that the thumb is urged toward the fingers by pneumatic pressure. However, in operations such as that involved in turning a screw driver, where it is desired that the tool be held in axial alignment with the axis of the hand, compensation must be made for the change in the position of the fingers 140 with respect to the longitudinal axis of the hand. To this end there are provided electrical circuits and elements illustrated in Figure 16 which provide one form of automatic means for effecting this compensation. The compensating means includes the motor 160 that is provided with a rotor 313 and a stator 314. Circuits and elements are provided whereby motor 160 is caused to operate as the motor 139 is operated. The direction in which motor 160 will rotate will bear a selected relationship to the rotation of motor 139 and will turn in such a direction that it will compensate for the displacement of the fingers 140 due to the rotation of the hand about its own longitudinal axis. Motor 160 is supplied with power through the same control elements described in connection with motor 139 so that it may be driven at the same speed as motor 139. This is accomplished by actuating the four-pole double-throw relay 315. Relay 315 may be actuated by the winding 316 which is connected across the mains 252 and 253. When the relay 315 is actuated to the position opposite to that which it occupies in Figure 16 then the rotor and stator of motor 160 are connected in parallel, respectively, with the rotor and stator of motor 139. As a result the same controls which initiate and control the operation of motor 139 initiate and control the operation of motor 160. The reversing switch 317 is provided to reverse the direction of rotation of motor 160 with respect to the rotation of motor 139. Motors 36, 42, 76, 96, 116, and 139 can only be operated when the master switch 318, located in main 252, is closed. Additionally, when motor 160 is connected in parallel with motor 139, as described above, it can be operated only when the master switch 318 is closed. If it is desired to adjust the span of the hand by adjusting fingers 140 with respect to the longitudinal axis of the hand by actuating motor 160 without rotating the hand about its longitudinal axis by motor 139, then this may be accomplished by the switching arrangement which comprises switches 319, 320, 321, and 322, providing the relay 315 is in the position shown in Figure 16. This will be the case when master switch 318 is open. These switches control the supply of power to motor 160 from mains 252 and 323 in a manner which will now be described.

Switches 319, 320, 321, and 322 are selectively operated in pairs to produce the desired direction of rotation of motor 160. When the switches occupy the positions shown in the diagram no voltage can be supplied to the motor 160. However, when switch 319 is open and switch 320 is closed, then power is supplied to motor 360 from the mains 323 and 252 through the completed rotor and stator circuits. This circuit includes the conductor 324, conductor 325, fuse 326, rotor 313, conductor 327, conductor 328, switch 320, conductor 329, conductor 330, fuse 331, stator winding 314, conductor 332, conductor 333, switch 321, and conductor 334. If it is desired to drive the motor 160 in the opposite direction then switches 319 and 320 would occupy the positions shown in the diagram and switch 321 would be opened and switch 322 closed. The operation of switches 321 and 322 select circuits for the motor 160 in a manner similar to that described above, but in this instance the stator winding is connected in an opposite sense, resulting in rotation of the motor 160 in the opposite direction. As pointed out above, switches 319 to 322 inclusive are adapted to be operated in pairs. These pairs, for example 319 and 320, may be single-pole double-throw switches of the microswitch type. These switches are shown in Figures 13 and 14 of the drawings mounted within the assembly 212 adjacent the back wall thereof. The back wall of assembly 212 is provided with an opening 335 so that the operator can extend his finger therethrough to operate the switches. These switches are so arranged that an operating lever 336 which is pivoted at 337 may be displaced to the left or to the right by the operator's finger to move the fingers of the manipulator in one direction or the other.

The master switch 318 in the main 253 as shown in Figure 16 may be mounted within the hand grip 213 of the controller actuating element in a manner such that it may be operated by a hinged plate 338 when the operator grips the element 213. With this arrangement, as soon as the operator releases the element 213, the switch 318 automatically opens.

The manner in which the thumb of the manipulator is caused to move in grasping or releasing objects will now be described with reference to the electrical circuit diagram in Figure 16, the schematic view of the pneumatic system shown in Figure 19, and the detailed views of the controller actuating element shown in Figures 13 and 14. Referring first specifically to Figure 19, a fluid, such as air, may be supplied to the cylinder for operation of the piston and its connected thumb from a source of supply, such as a pressure tank 339, through a pressure regulator 340, a control valve 341 and the associated conduits. Valve 341 may be a solenoid-operated valve which when de-energized is normally closed. In order to release fluid from the piston chamber, there is provided a second solenoid-operated valve 342. Valve 342 is normally closed when the solenoid is de-energized. When it is desired to discharge the fluid from the piston chamber, valve 342 is opened. The electrical conductors 343 extending from valve 341 correspond to the conductors bearing the same reference character in Figure 16. The conductors 344 leading from the valve 342 also bear the same reference character in Figure 16. In order to operate the thumb to grasp an object, switch 345 is actuated to the position opposite to that shown in Figure 16 to complete a circuit through the solenoid which actuates the valve 341 to open it. The actuating circuit for valve 342 is thereby broken and as a result valve 342 will close. When it is desired to release an object the switch 345 is thrown to the position shown in Figure 16 thus energizing the solenoid which actuates the valve 342 to open position. At the same time, the solenoid which actuates valve 341 is de-energized, allowing the valve to close. The disposition of the switch 345 on the actuating element of the controller is shown in Figures 13 and 14. This switch is mounted on the rear wall of the assembly 212 in such a position that the operator may actuate it with his thumb while grasping the grip element of the controller.

A second solenoid-operated valve 346 is provided in parallel with the valve 341. This valve, when its solenoid is energized, is held in closed position and plays no part in the control of the movement of the thumb. The conductors 347 leading from this valve have the same reference character in Figure 16. There it can be seen that the operating solenoid for valve 346 is connected directly to the power mains and is energized at all times when power is supplied to the system. Should the power supply fail, the valve 346 would open to maintain fluid pressure on the piston which operates the thumb. This is necessary for the reason that valve 341 would immediately close upon power failure and should leaks develop in the conduit or in the pressure chamber adjacent to the piston, the thumb would otherwise release its pressure on the object that it is holding.

The pressure regulator 340 may be adjusted to provide any desired fluid pressure for operating the thumb by the motor 348. The leads 349 extending from the motor correspond to those bearing the same reference character in Figure 16. These leads are connected to the power mains through a reversing switch 350, which may be operated to drive the motor 348 in either direction to obtain the desired fluid pressure for operating the thumb.

It is to be understood that the thumb of the manipulator could be operated without the spring 184 if the vent of solenoid-actuated valve 342 were connected to a vacuum pump or its equivalent. It is also to be understood that the member which actuates the thumb might be caused to move by supplying fluid under pressure to a bellows or diaphragm which might be adapted to replace the piston 183. It is evident that the fluid can be transmitted from the tubular member comprising the framework of the lower arm to the swivel 164 by an arrangement substantially the same as that employed in transmitting the fluid from the passageway within the tubular elements comprising the upper arm to the elements of the lower arm. Fluid pressure may be supplied by any conventional means other than that illustrated in Figure 19. For example, a variable speed pump may be provided, the control of which could be effected in a manner exactly similar to the manner in which the actuating motors of the manipulator are controlled.

As shown in Figures 3 and 4a all the motors which actuate the various elements of the manipulator, except motor 36 which imparts translatory movement to the manipulator along the rails 15 and 15', may be enclosed by a cover 351. This cover serves a useful purpose in that it protects the motors and provides a substantially isolated space therefor, which is adapted to be provided with ventilating means. Thus, for example, if the manipulator is to be operated in atmospheric conditions which would be injurious to the motors, a separate source of air not shown could be caused to circulate air through the chamber formed by the cover. With this arrangement the manipulator may be operated under extreme conditions of temperature or pressure, or in poisonous or corrosive atmospheres.

It is obvious to one skilled in the art that the plurality of motors enclosed by the cover 351 can be replaced by other means for operating the various elements of the manipulator. One manner in which they could be replaced would be that of substituting for each motor a self-synchronous motor which is adapted to be driven from a remote point by conventional electrical transmission means. The electric motors could also be replaced by fluid driven motors. Additionally, if it is desired, a single motor could be used with appropriate jack shafts and reversible clutches. Hydraulic or pneumatic cylinders adapted to operate rack gears that drive pinions mounted on shafts such as shafts 72, 92, and 112, shown in Figure 4a, could also be used. In the event that hydraulic or pneumatic cylinders are used for operating the manipulator it is to be understood that an appropriate control means must be provided.

The spur gear 65 and worm gear 68 could be replaced by a pinion fixed to the shaft 58 in the position of the spur gear and adapted to be operated by a rack gear or its equivalent. The rack gear could be vertically disposed relative to the pinion and be operated through a vertical shaft by a hydraulic cylinder or by an electric motor. This change would not effect the versatility of the manipulator. This also applies to the spur gear 109 and its associated worm gear and the spur gear 88 and its associated worm gear.

Obviously, the chains 136 and 156 could be replaced by shafts and bevel gears such as the shaft 92 and bevel gears 90 and 91 which would drive an appropriate worm gear and a spur gear which would replace the sprocket wheels. Here again the worm gear and spur gear could be replaced by a rack gear and pinion gear in the manner described above.

The chains 107, 132, 152' and 86 and their associated sprocket wheels can be replaced by their obvious equivalents such as cables, belts, etc. Additionally these same chains and their associated sprocket wheels could be replaced by appropriate rigid members and operating cranks, respectively. This is accomplished by substituting for each pair of sprockets connected by an endless chain, a pair of cranks having lengths equal to the radii of the sprockets which they replace. It is to be understood that the cranks would be mounted in the same manner that the sprockets were mounted. The free ends of each pair of cranks would be pivotally connected by a rigid member having a length equal to the distance between the axes of the pair of cranks. This substitution will not appreciably restrict the versatility of the manipulator. Additionally, it is obvious that the endless chains could be replaced by appropriate shafts that would drive, at their opposite ends, suitable bevel gears secured in the same manner as the sprocket wheels.

The motor that is adapted to produce rotation of the hand of the manipulator about its longitudinal axis could obviously be mounted on the truss elements of the hand and controlled by suitable conductors disposed along the arm of the manipulator to the power transmission cable. Additionally the motor which produces displacement of the fingers with respect to the longitudinal axis of the hand could also be mounted on the truss elements of the hand and provided with similar power transmission means.

This invention also contemplates elimination of one section of the manipulator or, when desired, the addition of another section to the manipulator.

The turnbuckles which form a part of the frame structure of the sections of the manipulator have been provided for the purpose of adjusting the tension in the endless chains. The turnbuckles may be eliminated by making the frame elements of the correct length for the length of chain used or by providing suitable idlers for tightening the chains.

It is obvious that other modifications of the manipulator as well as modifications of the controller may be made by those skilled in the art and therefore the present invention is not to be restricted in any way other than by the scope of the claims.

I claim:

1. A system for performing operations at a remote point comprising in combination a manipulator, said manipulator having elements corresponding to a hand having a thumb and fingers, lower arm, upper arm, and shoulder, means for pivotally connecting said elements in operative relationship, means for independently moving the elements about their pivotal axes, means for rotating the hand about its own longitudinal axis, means for actuating the thumb and fingers of said hand, a controller, transmission means connecting said controller with said means for moving said elements, independent means adapted to be actuated by said controller for selectively initiating the operation of said element-moving means to move them about their pivotal axes, means also adapted to be actuated by said controller for producing rotation of the hand about its own longitudinal axis, means also actuable by said controller for operating said thumb and finger actuating means, and additional independent means for respectively controlling the speed of movement of said elements.

2. A mechanical manipulator having independently movable elements corresponding to a human shoulder, arm, hand, and fingers pivotally connected together in the form of a human upper limb, independent means for moving the respective elements, means for supplying power to said independent means, a controller adapted to selectively initiate the operation of said independent means and control the speed at which they are operated, said controller comprising an actuating element adapted to be engaged by the arm and hand of an operator, means for supporting said actuating element in such a manner that it has substantially all of the degrees of freedom of movement that the arm and hand of the operator have, independent means actuable by the movement of the controller in the manner corresponding to each of the degrees of freedom for energizing selected manipulator element-moving means, and additional means actuable by the controller on further displacement in each direction of movement thereof for varying the speed of movement of the elements of the manipulator.

3. A manipulator of the type that is adapted to be operated and controlled by an operator positioned at a remote location that comprises in combination elements corresponding to a hand, lower arm, upper arm and shoulder, and means for pivotally connecting said elements together, and means for operating said elements in such a manner as to allow any elements to be operated without causing to be disturbed the orientation with respect to a horizontal plane of the elements not operated.

4. A manipulator comprising in combination a plurality of elements, means for pivotally connecting said elements together to form an arm, one end element of said arm being adapted to grasp an object, independent means for moving said elements, means for energizing at least one of said element moving means to flex the arm, and means corresponding in number to the number of elements that do not grasp the object pivotally engaged with said connecting means and adapted to respectively span the elements that do not grip the object for maintaining the element which grips the object oriented in space when moving the arm.

5. A device for handling objects adapted for use with a mechanical manipulator comprising a hand having thumb and finger elements, means for securing said device to the manipulator, fluid driven means adapted to move the thumb element with respect to the finger elements of the hand as in gripping an object, means for supplying fluid to said thumb element-moving means to move the thumb element and to control the force exerted by the thumb in gripping an object, independent means for displacing the fingers with respect to the longitudinal axis of the hand to vary the span of the hand, and means for energizing said finger displacing means.

6. A device for handling objects adapted for use with a mechanical manipulator comprising a hand having thumb and finger elements, means for securing said device to the manipulator, fluid driven means adapted to move the thumb element with respect to the finger elements of the hand as in gripping an object, means for supplying fluid to said thumb element-moving means to move the thumb element and to control the force exerted by the thumb in gripping an object, independent means for displacing the fingers with respect to the longitudinal axis of the hand to vary the span of the hand, means for energizing said finger displacing means, means for rotating the hand about its longitudinal axis while gripping an object, and means for energizing said rotating means.

7. A manipulator of the type having a plurality of elements corresponding to the shoulder, upper arm, forearm, and hand of a human arm; means for pivotally connecting the elements together to form an arm that may be flexed; and common means for flexing the arm, maintaining it in flexed position, and maintaining during the flexing of said arm the orientation of the elements not caused to be rotated about their respective pivotal axes during the flexing operation.

8. A system for performing and supervising the performance of operations at a remote location that comprises in combination a manipulator having elements corresponding to the elements of a human arm, a television camera disposed adjacent to said manipulator at the remote location, a controller for motivating the elements of the manipulator for controlling the manipulator to produce coordinated movement of the elements to cause the manipulator to simulate the movement of a human arm, a television receiver having a screen located adjacent said controller, electrical transmission means connecting the elements of the manipulator and camera at the remote location to the controller and television receiver whereby the operations performed by the manipulator may be controlled and supervised.

9. A system for performing operations at a remote location comprising in combination a manipulator having a plurality of independently movable elements, means for independently motivating the elements of the manipulator, a controller, an operating element for said controller adapted to be operated in a plurality of directions, separate means actuable by the operating element when moved in the respective directions for energizing the element-motivating means to cause the respective motivated elements to move in a direction related to the direction of displacement of the operating element, and means for reversing the sense of the relation between the sense of the displacement of the operating element and the direction of movement of the respective motivated elements.

10. A mechanical manipulator having a support means including a member rotatable about a vertical axis, an upper arm pivotally connected to the support member for movement about a first transverse axis to form a shoulder joint, a lower arm pivotally connected to the upper arm for movement about a second transverse axis to form an elbow joint, a hand pivotally connected to the lower arm for pivotal movement about a longitudinal axis to form a wrist joint, first means for moving said upper arm about said first transverse axis, second means for moving said lower arm about said second transverse axis, third means for moving said hand about said third transverse axis, fourth means for moving said support member about said vertical axis, a controller comprising an elongated arm rest adapted to be engaged by the arm and hand of an operator, first support means for mounting said arm rest for reciprocal movement, means responsive to reciprocal movement of said arm rest to cause said upper arm to pivot about said first transverse axis, second support means for mounting said first support means for oscillatory movement in a vertical plane, means responsive to oscillation of said arm rest to cause said lower arm to pivot about said second transverse axis, means supported adjacent one end of said arm rest rotatable about a longitudinal axis parallel to said arm rest, means responsive to said last means for causing said hand to rotate about its longitudinal axis, third support means for mounting said second support means for rotation about a vertical axis, and means responsive to rotation of said arm rest about said last-mentioned vertical axis for causing said support member to rotate about its vertical axis.

References Cited in the file of this patent

UNITED STATES PATENTS

| | | |
|---|---|---|
| 1,880,138 | Hubl | Sept. 27, 1932 |
| 2,277,416 | Rutten | Mar. 24, 1942 |
| 2,306,862 | Bown | Dec. 29, 1942 |
| 2,476,249 | Payne | July 12, 1949 |
| 2,541,574 | Crooks | Feb. 13, 1951 |

FOREIGN PATENTS

| | | |
|---|---|---|
| 417,663 | Great Britain | Oct. 8, 1934 |
| 525,009 | Great Britain | Aug. 20, 1940 |